United States Patent
Choi et al.

(10) Patent No.: US 9,955,291 B2
(45) Date of Patent: Apr. 24, 2018

(54) METHOD AND DEVICE FOR CONTROLLING GROUP DEVICE USING BLUETOOTH IN WIRELESS COMMUNICATION SYSTEM

(71) Applicant: LG ELECTRONICS INC., Seoul (KR)

(72) Inventors: Jingu Choi, Seoul (KR); Jangwoong Park, Seoul (KR); Younghwan Kwon, Seoul (KR); Taeyoung Song, Seoul (KR); Hyeonjae Lee, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/406,115

(22) Filed: Jan. 13, 2017

(65) Prior Publication Data
US 2017/0201854 A1    Jul. 13, 2017

Related U.S. Application Data

(60) Provisional application No. 62/277,968, filed on Jan. 13, 2016.

(51) Int. Cl.
| H04B 7/00 | (2006.01) |
| H04W 4/00 | (2018.01) |
| H04W 72/04 | (2009.01) |
| H04W 84/18 | (2009.01) |

(52) U.S. Cl.
CPC ....... *H04W 4/008* (2013.01); *H04W 72/0406* (2013.01); *H04W 84/18* (2013.01)

(58) Field of Classification Search
CPC .. H04W 4/008; H04W 72/0406; H04W 84/18
USPC ......................................................... 455/41.2
See application file for complete search history.

(56) References Cited

U.S. PATENT DOCUMENTS

| 2012/0202425 A1* | 8/2012 | Glezerman | ........... H04W 84/18 455/41.2 |
| 2013/0346494 A1* | 12/2013 | Nakfour | .............. H04L 67/1095 709/204 |
| 2015/0121470 A1* | 4/2015 | Rongo | ................. H04L 41/0813 726/4 |
| 2015/0201023 A1* | 7/2015 | Kotab | ..................... H04L 65/60 709/208 |
| 2016/0366642 A1* | 12/2016 | Singh | ................ H04W 52/0212 |

* cited by examiner

*Primary Examiner* — Ayodeji Ayotunde
(74) *Attorney, Agent, or Firm* — Birch, Stewart, Kolasch & Birch, LLP

(57) ABSTRACT

Disclosed is a method of a first device being controlled by a control device in a group including the first device and a plurality of devices in a Bluetooth mesh network and a device performing the method. The method includes joining the Bluetooth mesh network, receiving a control message instructing the execution of a specific operation from the control device, and performing the specific operation based on the control message. The specific operation may be sequentially performed by the first device and the plurality of devices.

11 Claims, 25 Drawing Sheets

[Fig.1]
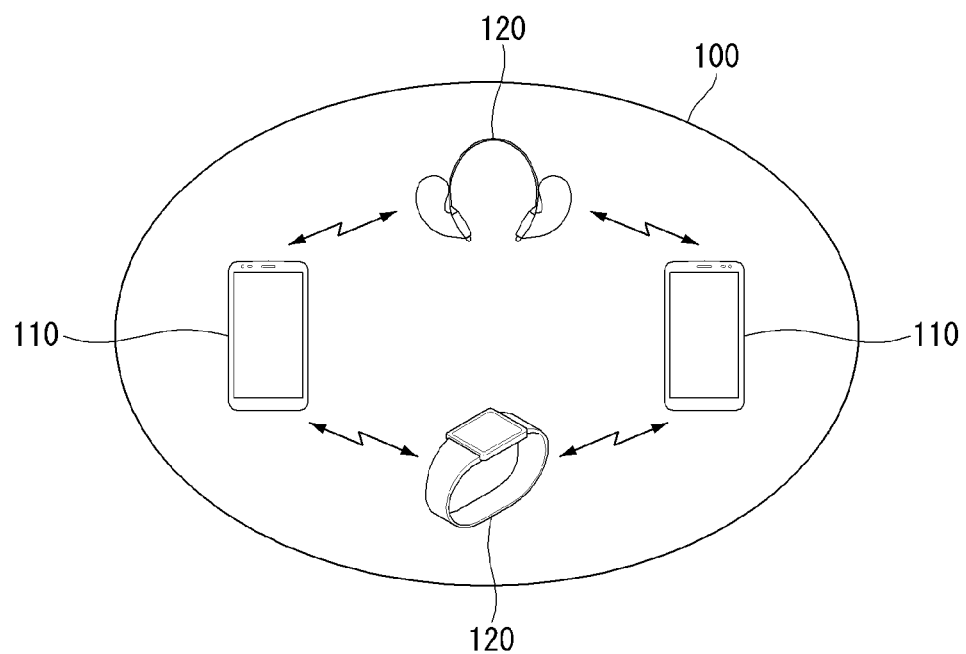

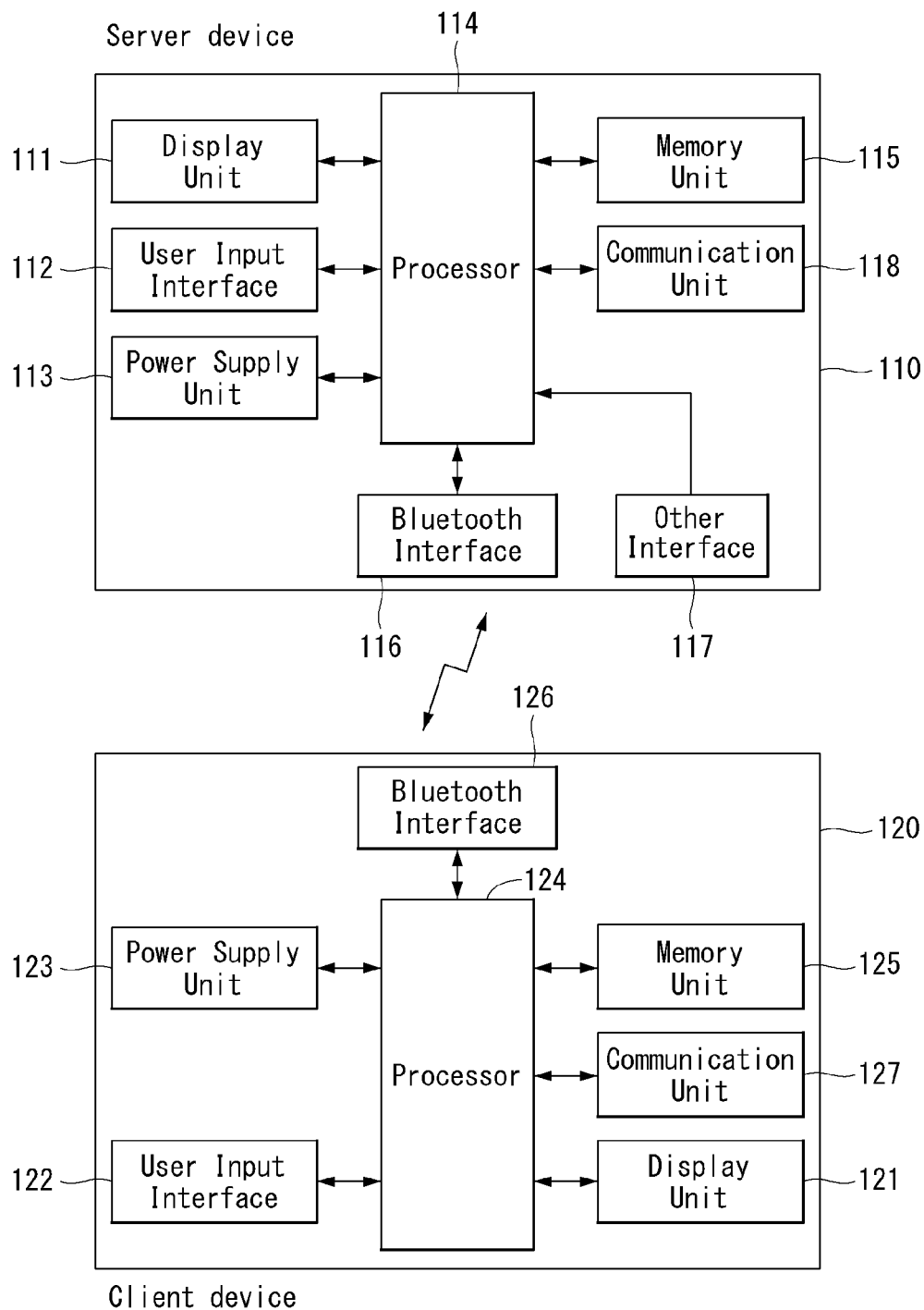
[Fig.2]

[Fig.3]
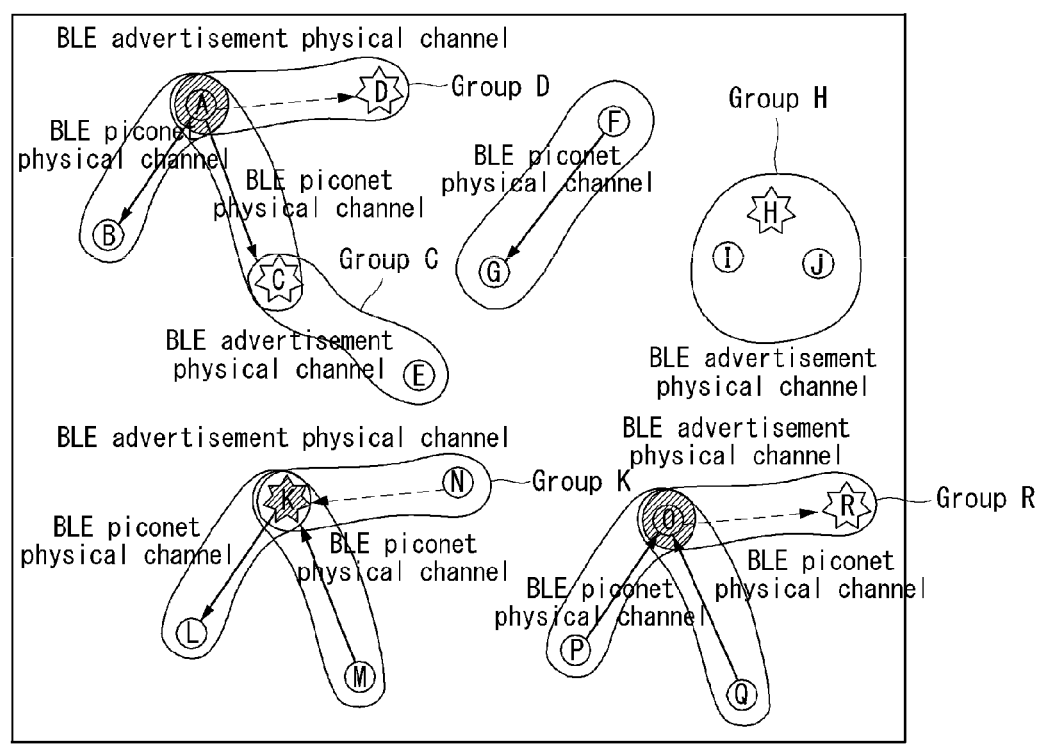

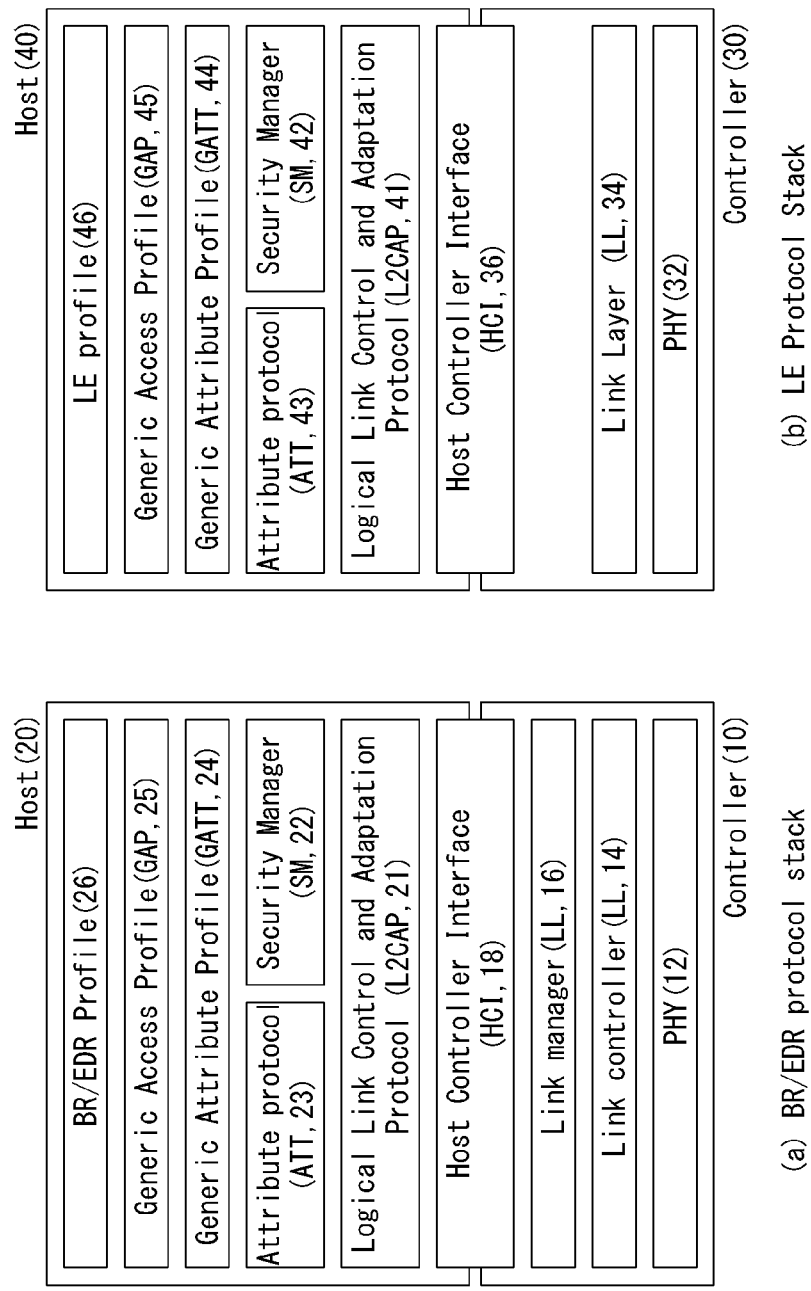

[Fig.5]
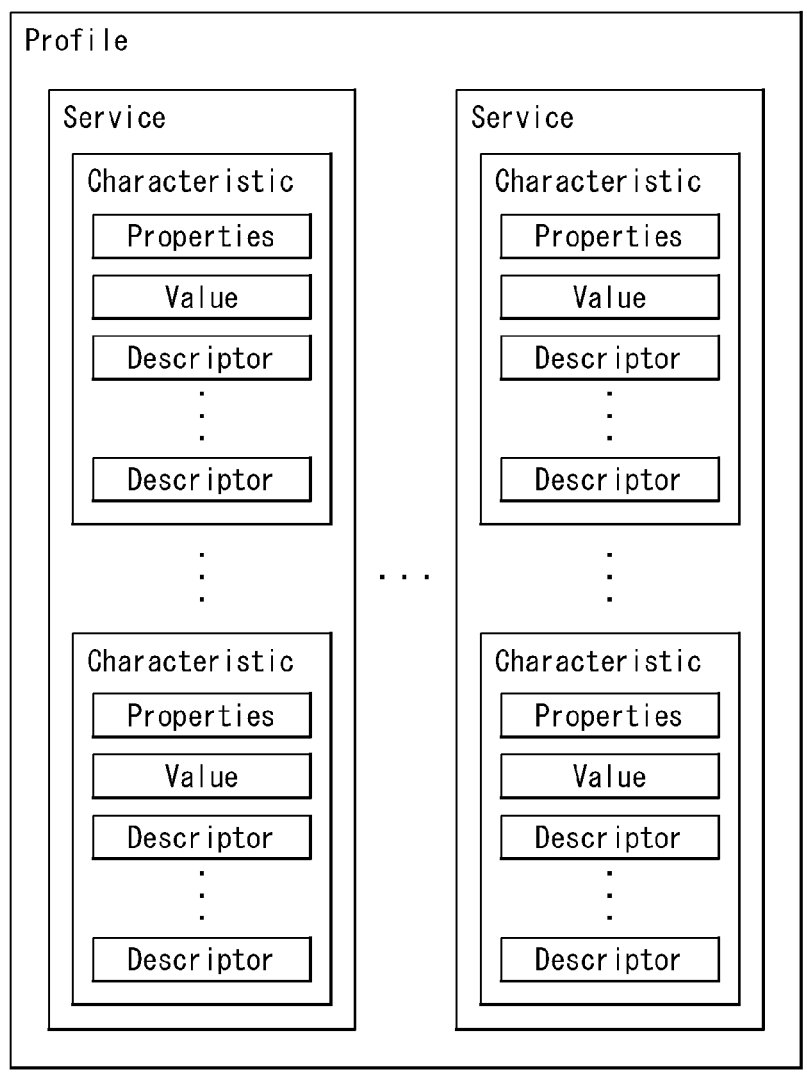

[Fig.6]
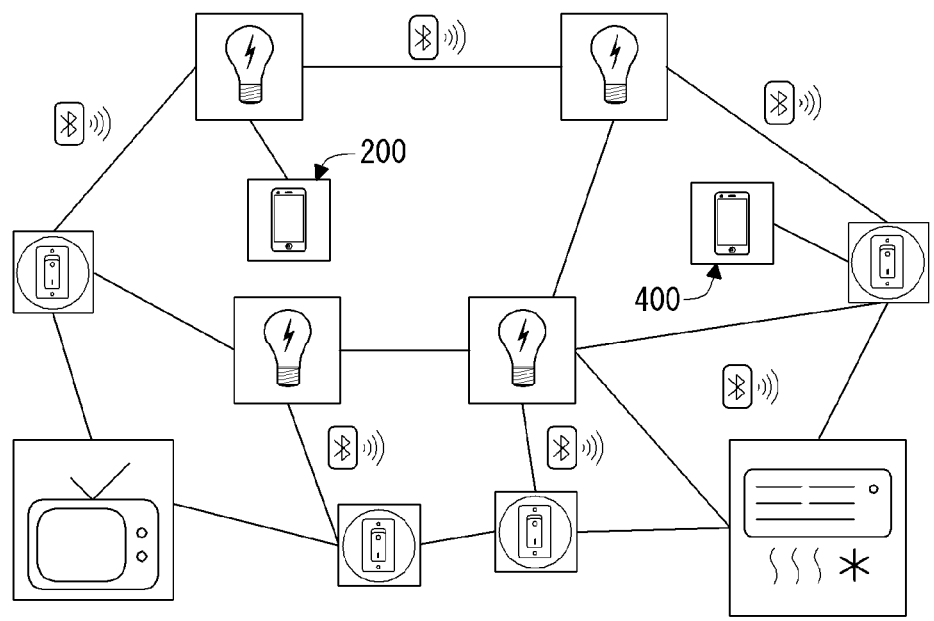

[Fig.7]
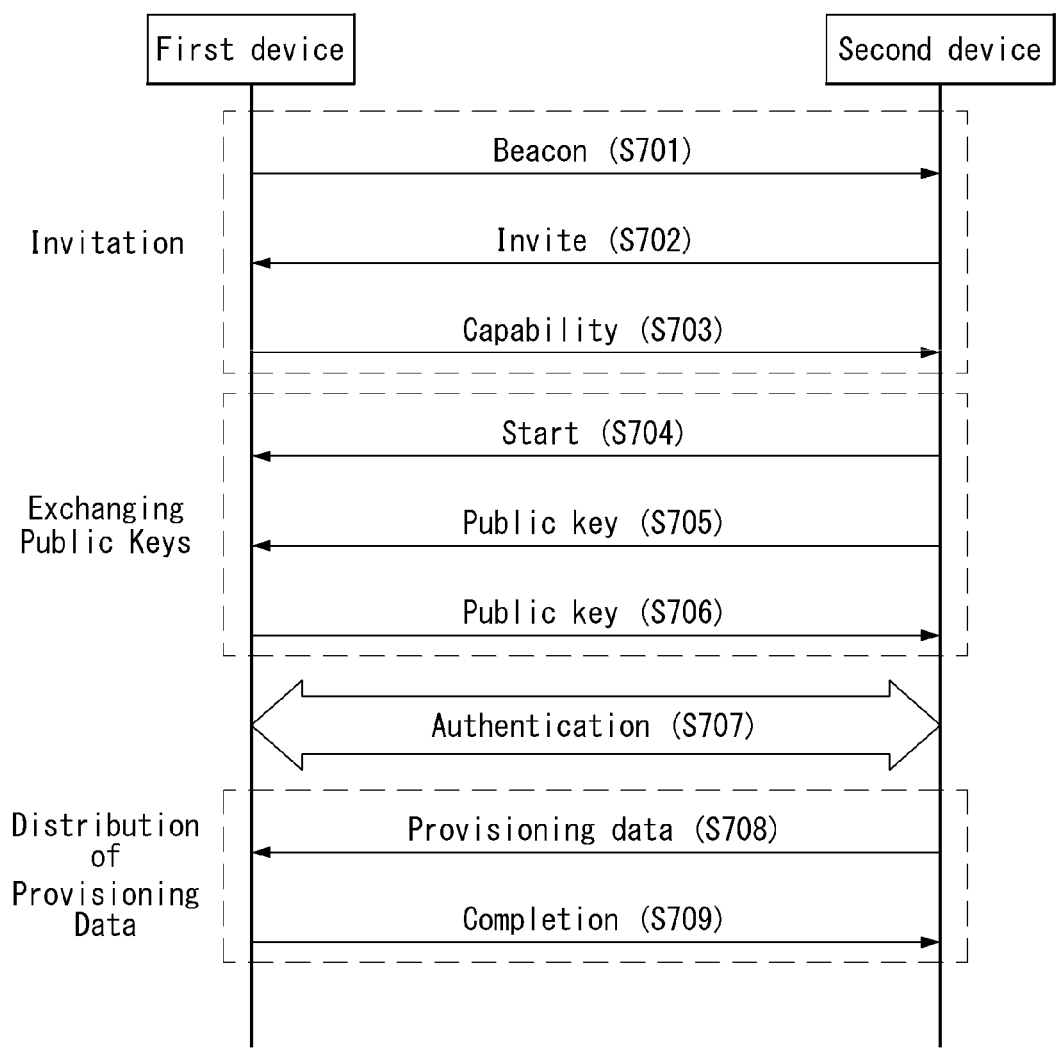

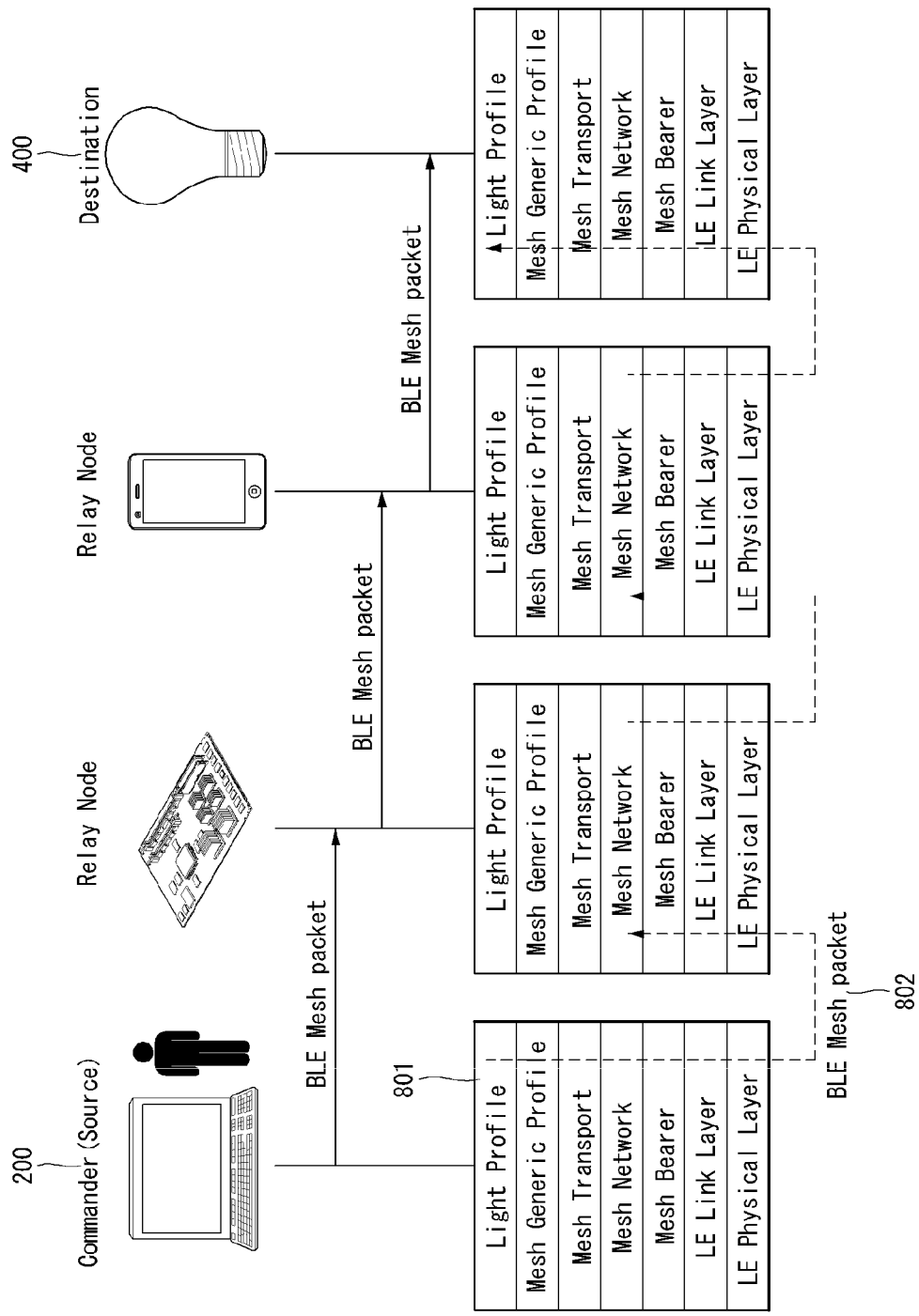

[Fig.9]

(a) | Length | AD Type | Service UUID | Beacon Type | Device UUID |

(b) | Length | AD Type | Service UUID | Beacon Type | KR+NID | CIVI | CMAC |

(c) | Length | AD Type | IVNID | PFT | SEQ | SRC | DST | OP | TID | Payload | MICapp | MICnet |

[Fig.10]
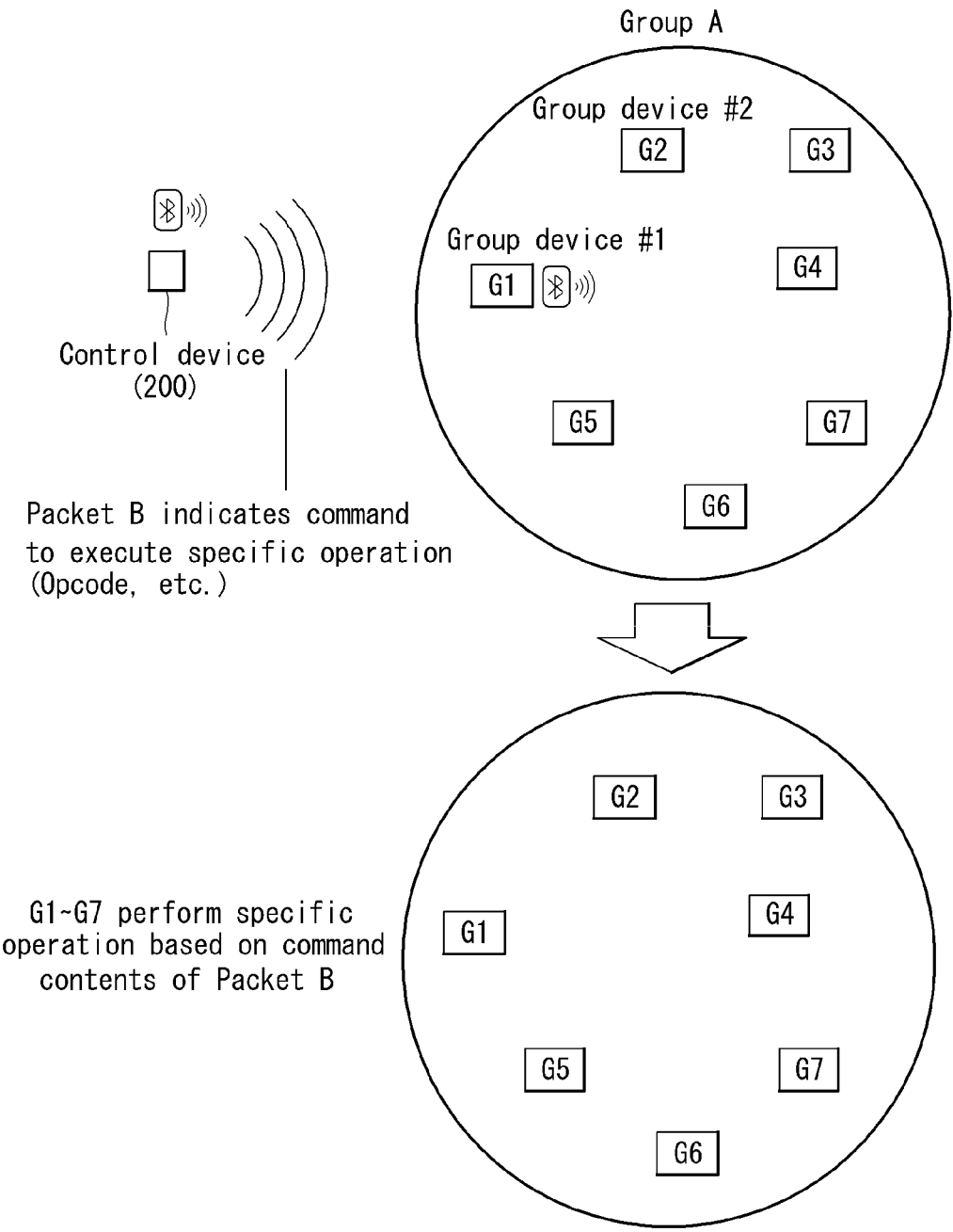

[Fig.11]
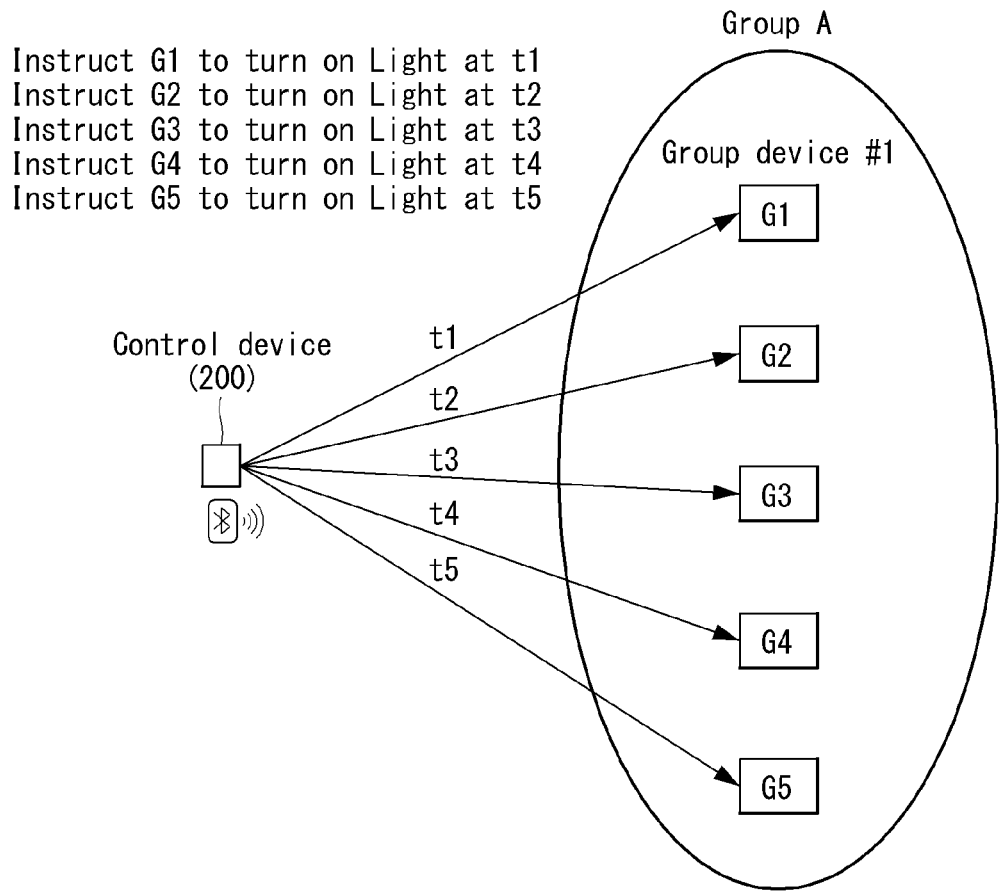

[Fig.12]
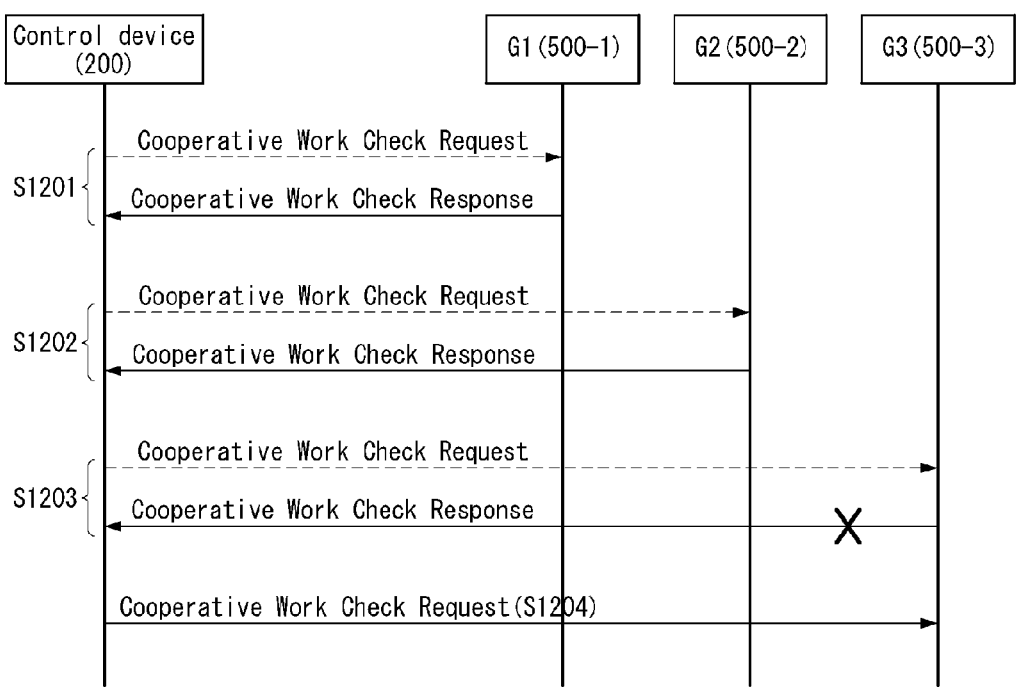

[Fig.13]
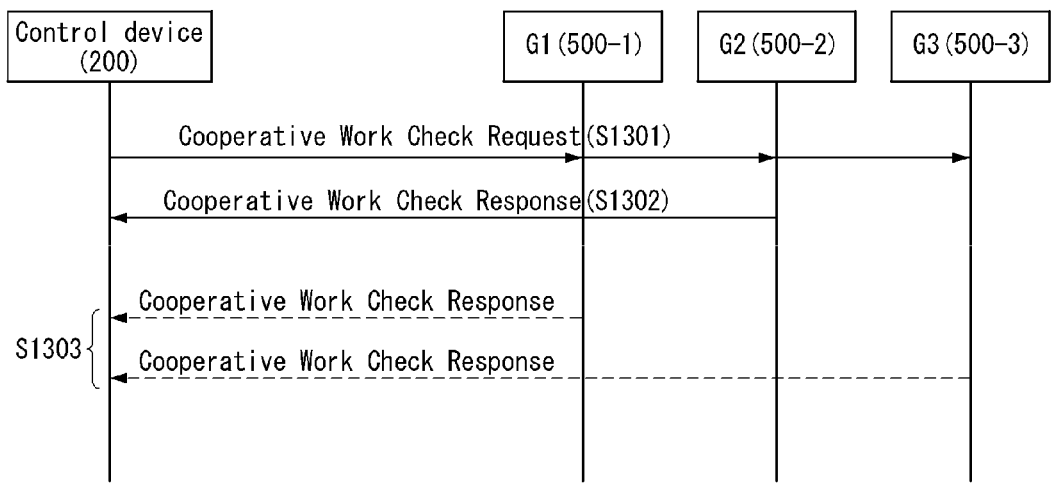

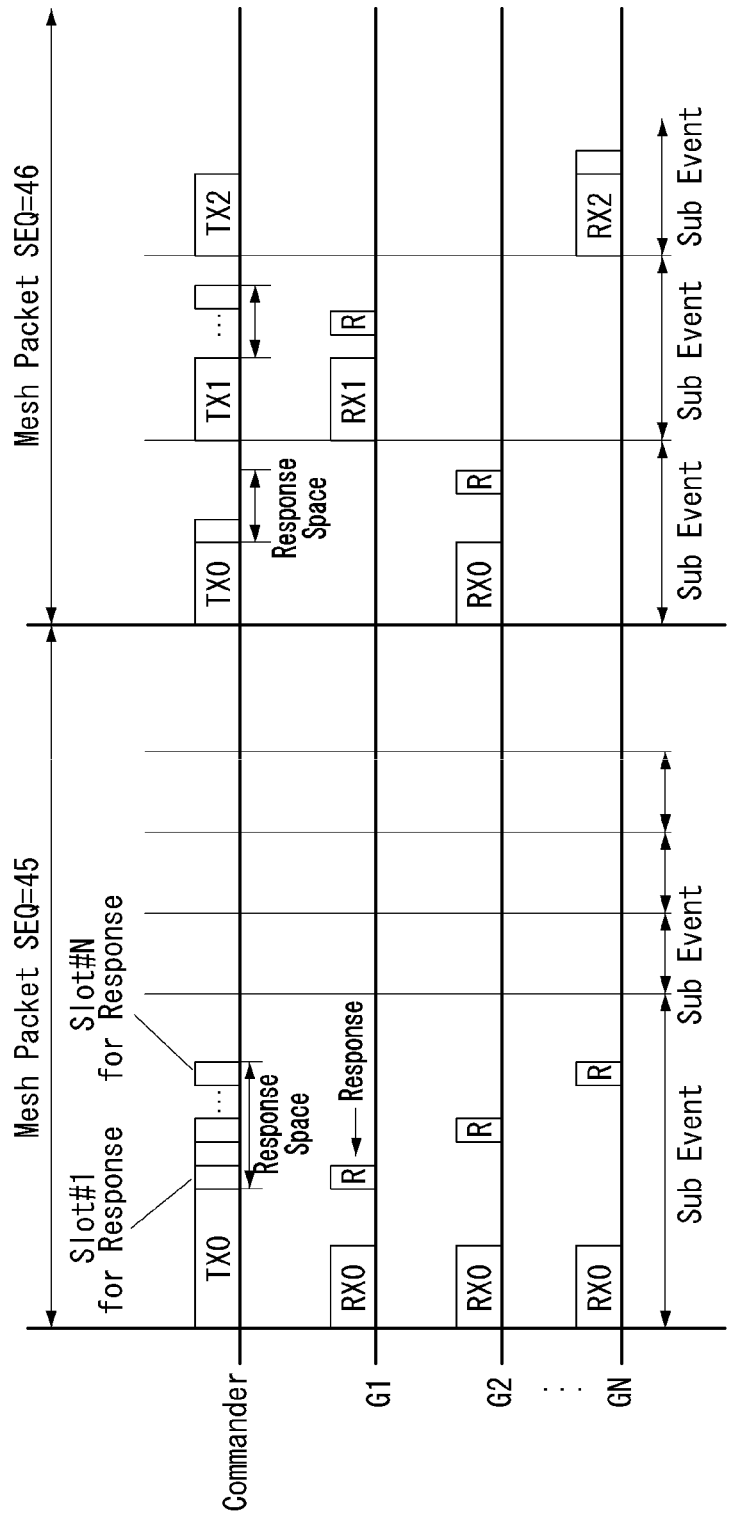

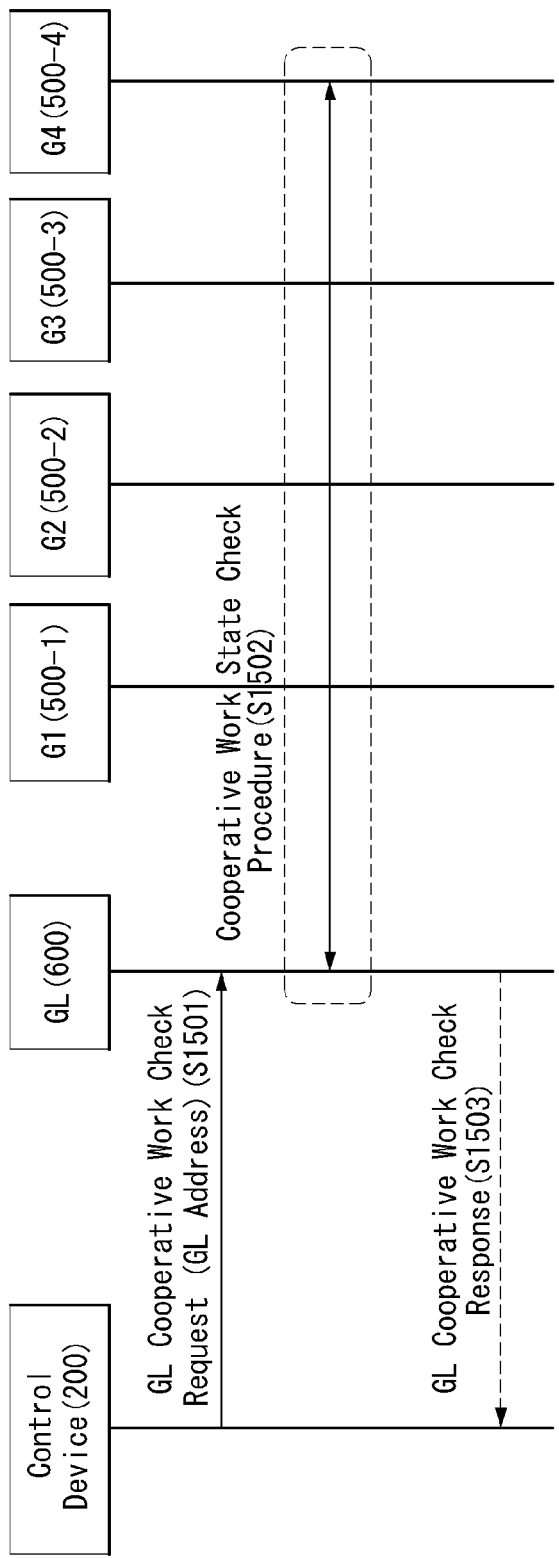
[Fig.15]

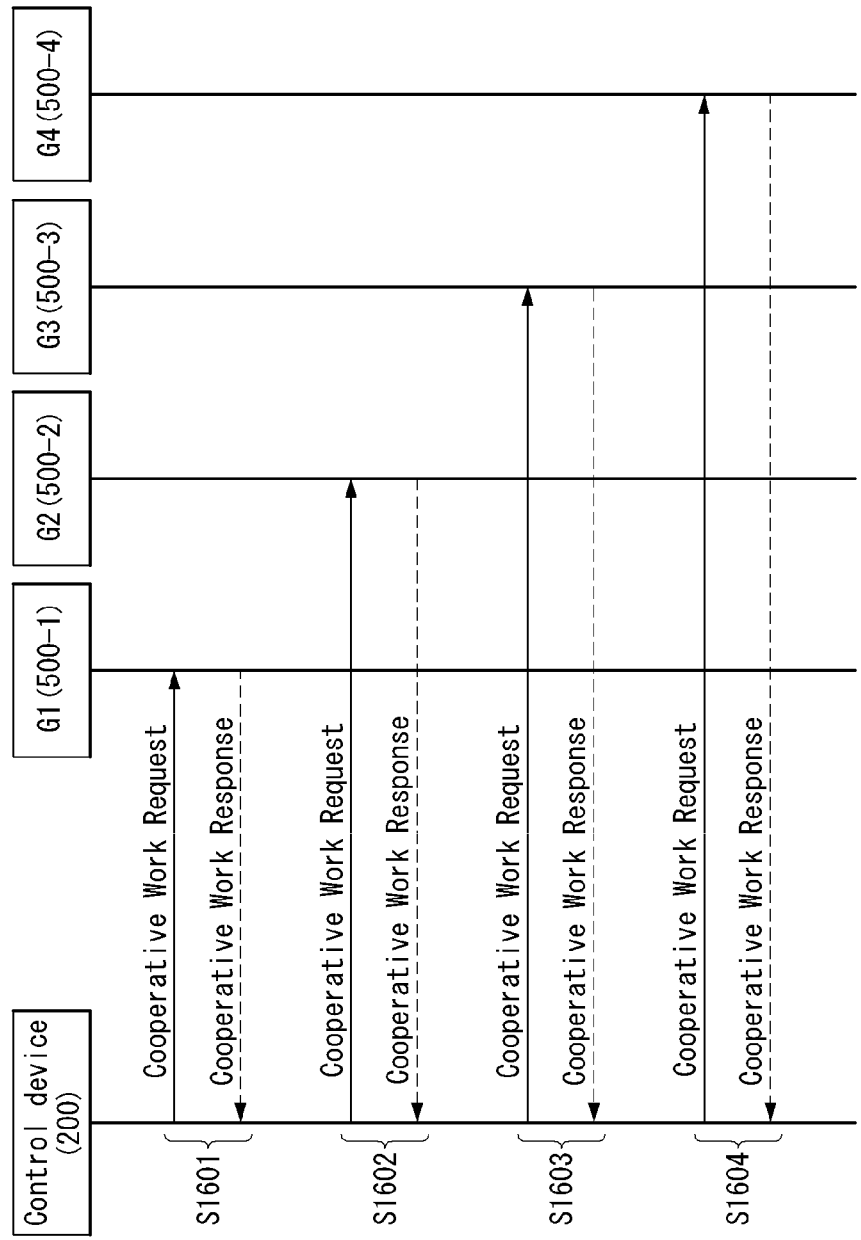

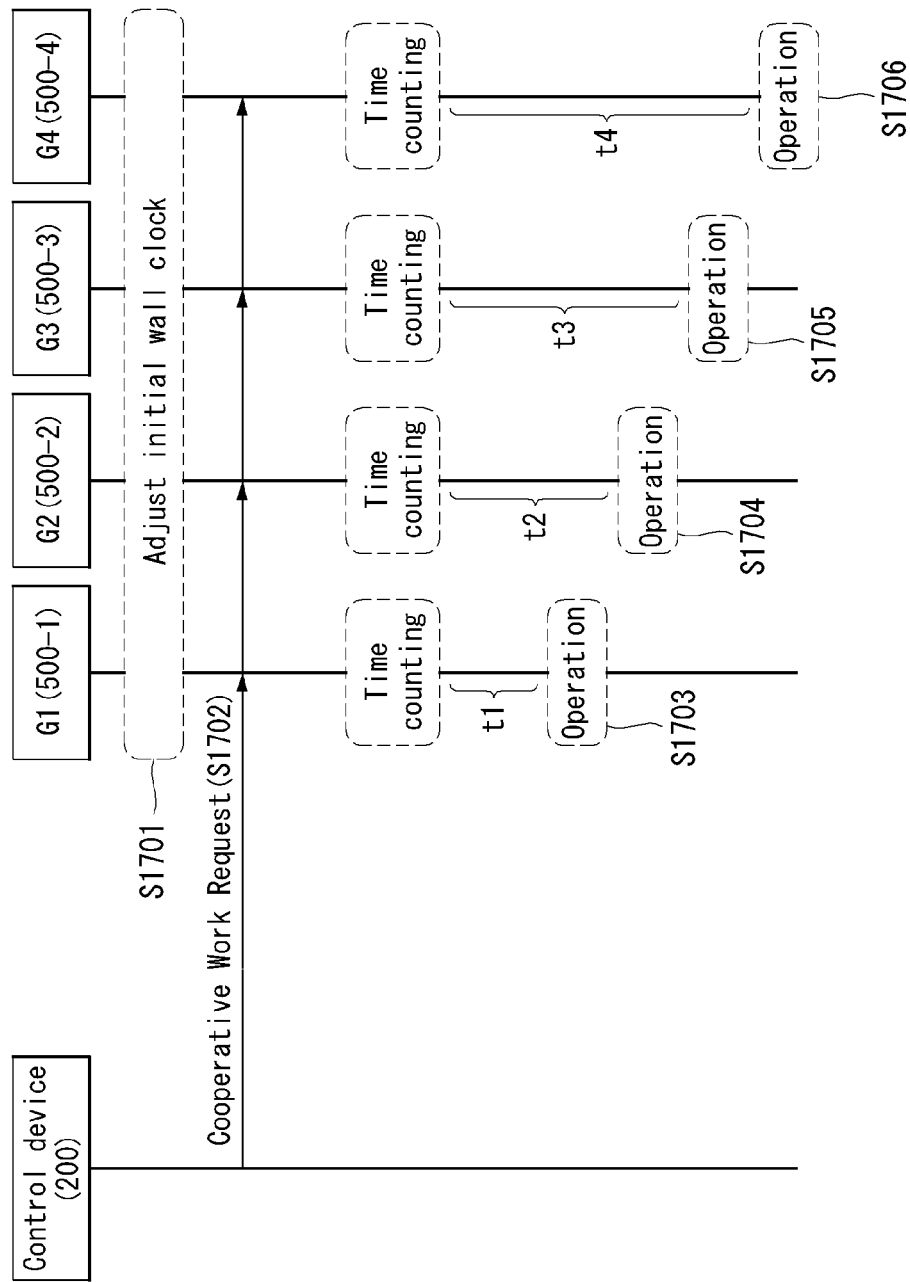

[Fig.18]

| Message Name | Opcode |
|---|---|
| App Net Get | 0x80 0x50 |
| App Net Status | 0x80 0x51 |
| AppKey Add | 0x80 0x60 |
| AppKey Check | 0x80 0x61 |
| AppKey Delete | 0x80 0x62 |
| AppKey Status | 0x80 0x63 |
| Cooperative Work | 0x80 0x99 |
| ... | ... |

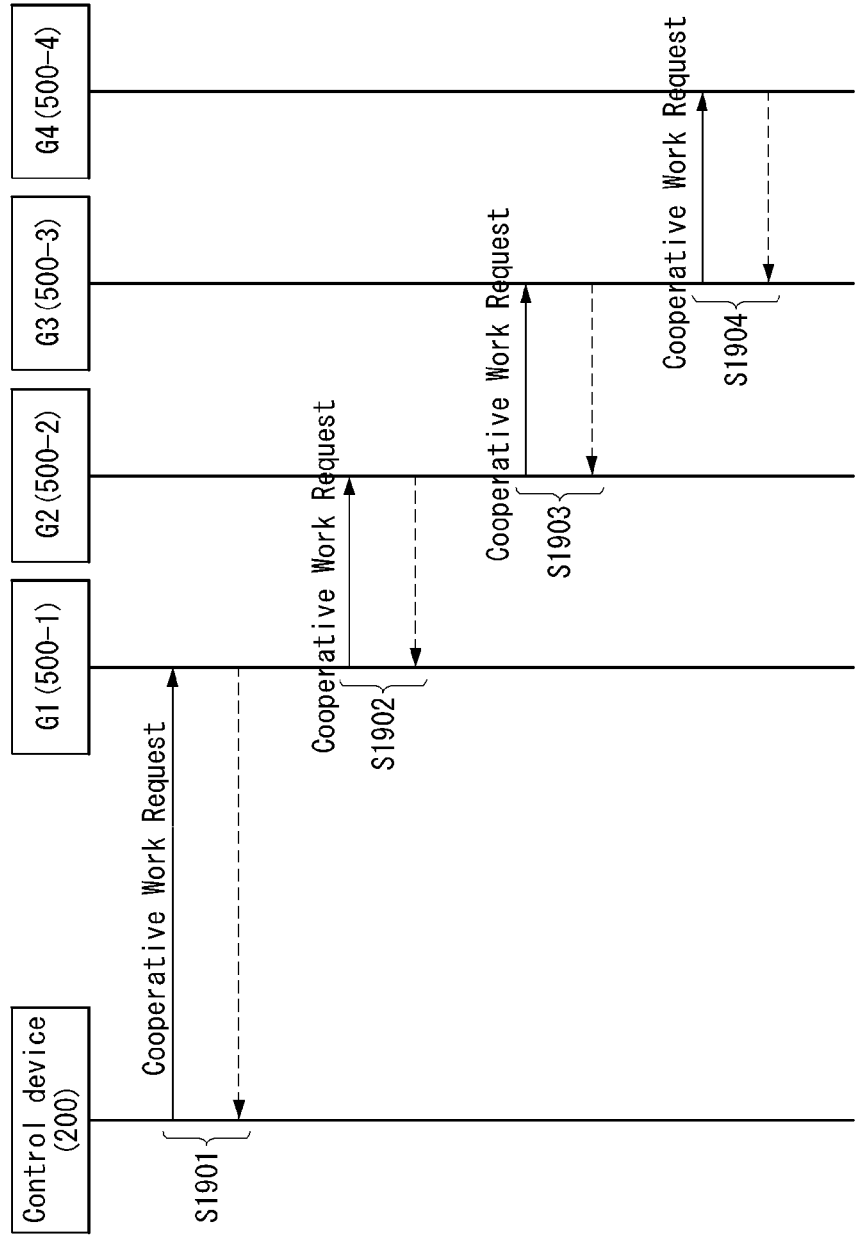

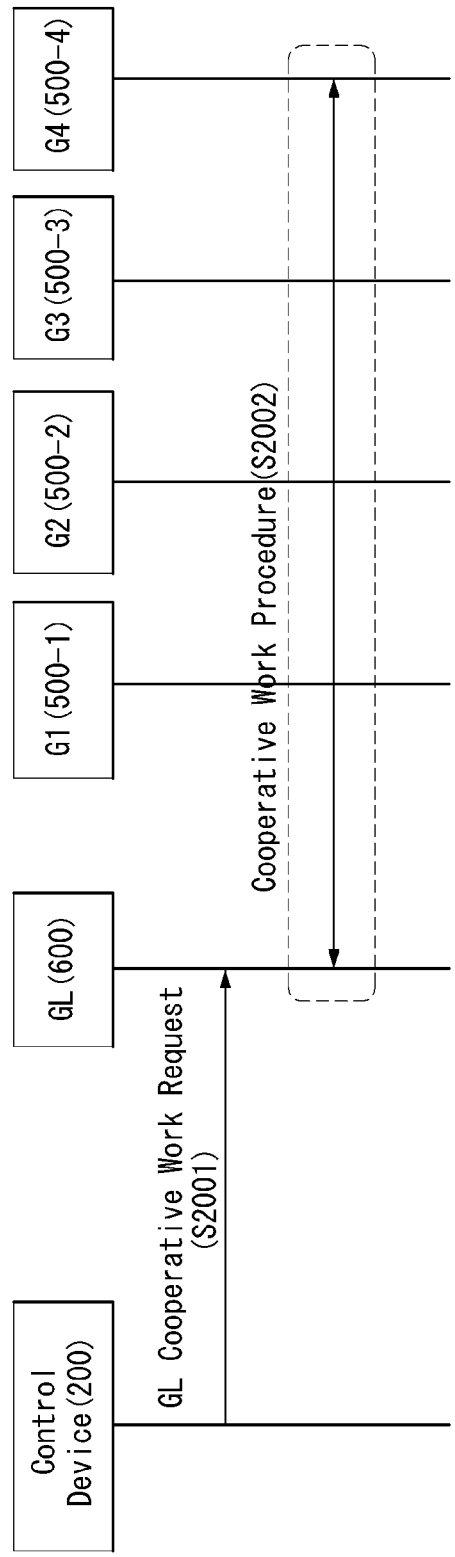
[Fig.20]

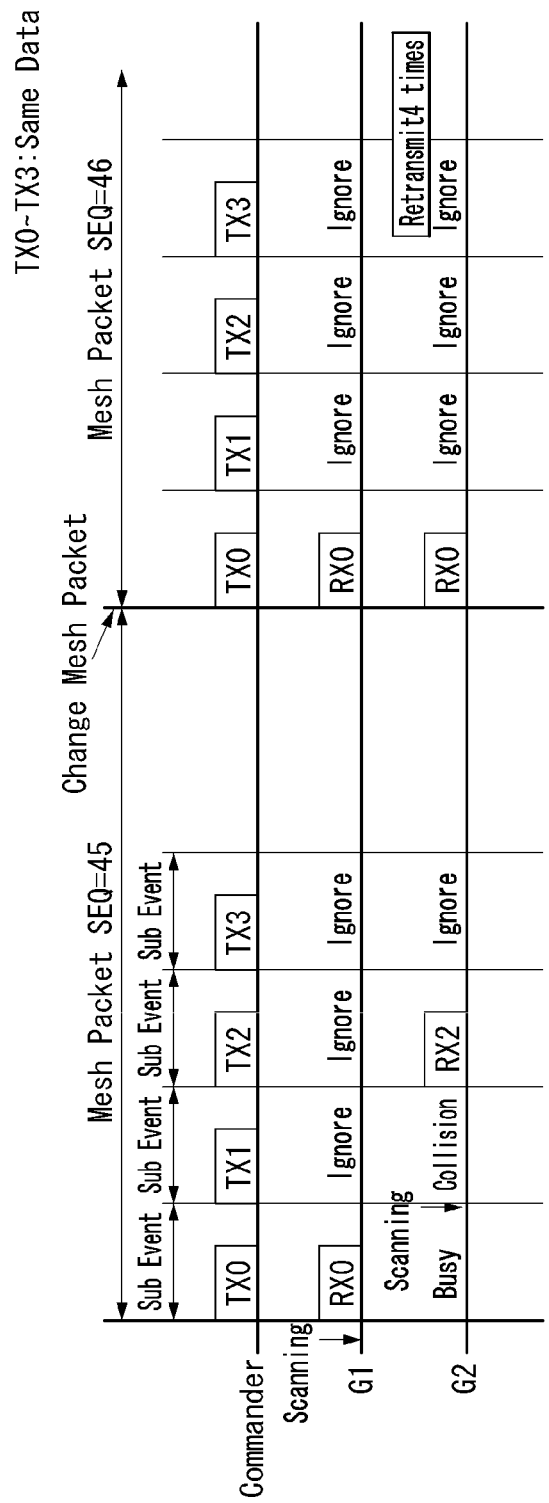
[Fig.21]

[Fig.22]
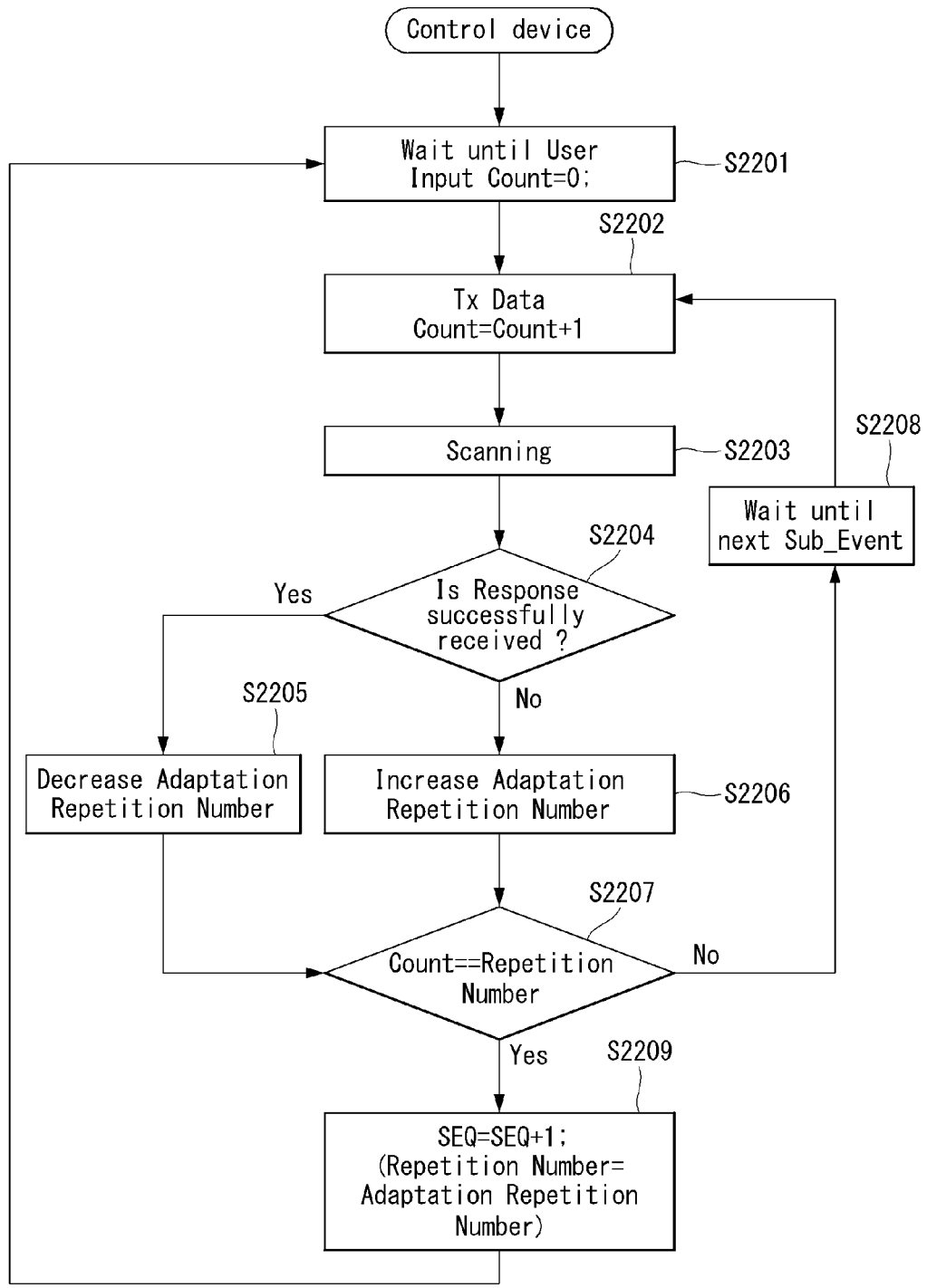

[Fig.23]
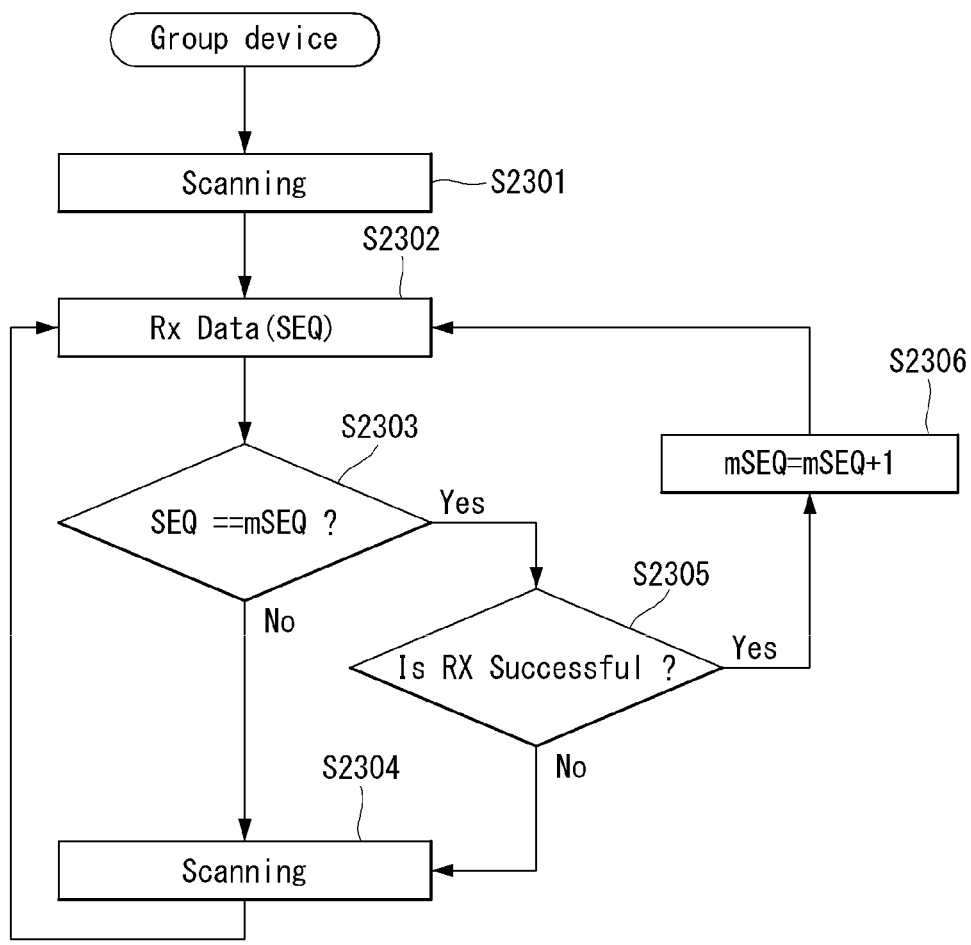

[Fig.24]
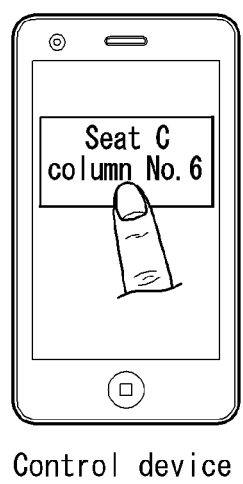
Control device
(a)
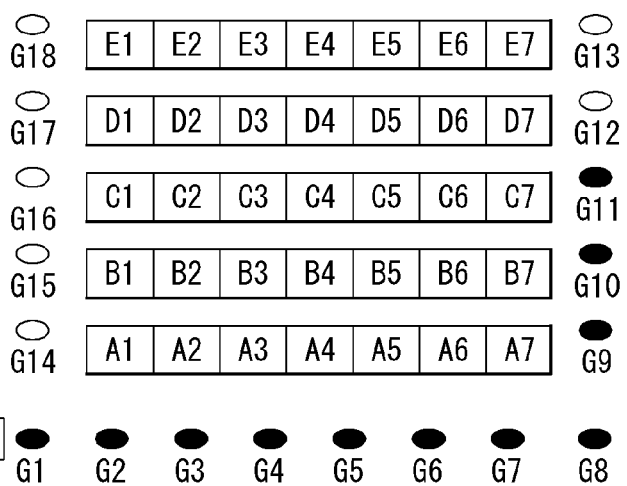
(b)

[Fig.25]
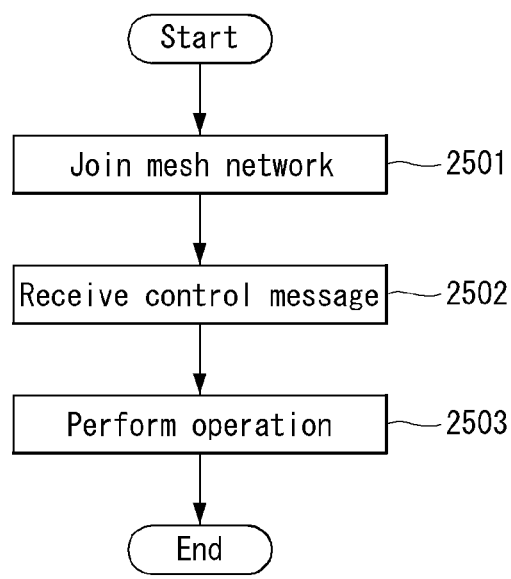

METHOD AND DEVICE FOR CONTROLLING GROUP DEVICE USING BLUETOOTH IN WIRELESS COMMUNICATION SYSTEM

CROSS-REFERENCE TO RELATED APPLICATION

This application claims priority to Provisional Application No. 62/277,968 filed in U.S.A. on Jan. 13, 2016, which is hereby incorporated by reference in its entirety.

BACKGROUND OF THE INVENTION

Field of the Invention

The present invention relates to a method and device for controlling a device using Bluetooth, that is, a short-distance technology, in a wireless communication system and, more particularly, to a method and device for controlling a group device in a Bluetooth mesh network.

Discussion of the Related Art

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

SUMMARY OF THE INVENTION

An object of the present invention is to provide a method and device for controlling a group device using a Bluetooth low energy (BLE) technology.

Furthermore, an object of the present invention is to provide a method and device for controlling a device of a group node in a mesh network using Bluetooth.

Furthermore, an object of the present invention is to check the state of group devices using a Bluetooth LE mesh packet.

Furthermore, an object of the present invention is to send a command using a Bluetooth LE mesh packet so that group devices cooperate to perform a specific operation.

Furthermore, an object of the present invention is to allow group devices in a mesh network to sequentially perform a specific operation using Bluetooth.

Technical objects to be achieved by the present invention are not limited to the aforementioned objects, and those skilled in the art to which the present invention pertains may evidently understand other technological objects from the following description.

This specification relates to Bluetooth data transmission and reception and, more particularly, to method and device for transmitting data between devices using a Bluetooth low energy (BLE) technology.

In an aspect of the present invention, a method of a first device being controlled by a control device in a group including the first device and a plurality of devices in a Bluetooth mesh network includes joining the Bluetooth mesh network, receiving a control message instructing the execution of a specific operation from the control device, and performing the specific operation based on the control message. The specific operation may be sequentially performed by the first device and the plurality of devices.

In another aspect of the present invention, a first device controlled by a control device in a group including the first device and a plurality of devices in a Bluetooth mesh network includes a communication unit configured to perform communication with the outside in a wired or wireless manner and a processor functionally connected to the communication unit. The processor is configured to join the Bluetooth mesh network, receive a control message instructing the execution of a specific operation from the control device, and perform the specific operation based on the control message. The specific operation may be sequentially performed by the first device and the plurality of devices.

The method may further include synchronizing the time for operations of the first device and the plurality of devices with the plurality of devices. The control message may include a time interval field indicating a time interval in which the specific operation is performed between the first device and the plurality of devices, a delay time field indicating delay time from time when the control message is received to time when the specific operation is performed or a reference time field indicating reference time which is a reference for performing the specific operation.

If the control message includes the time interval field, the specific operation may be sequentially performed by the first device and the plurality of devices based on the time interval.

If the control message includes the delay time field, the specific operation may be performed by the first device and the plurality of devices based on the delay time. The delay time may be individually set in each of the first device and the plurality of devices.

If the control message includes the reference time field, the specific operation may be performed by the first device and the plurality of devices after a lapse of a specific time from the reference time. The specific time may be individually set in each of the first device and the plurality of devices.

The control message may be sequentially transmitted between the first device and the plurality of devices according to the operation sequence of the specific operation.

The method may further include transmitting the control message to the plurality of devices. The first device may perform a role of transferring the message transmitted by the control device to the plurality of devices.

The control message may be repeatedly transmitted to the first device and the plurality of devices by a specific number of times.

The specific number may be decreased if the first device and the plurality of devices successfully receive the control message and may be increased if at least one of the first device and the plurality of devices does not receive the control message.

The method may further include receiving a request message to request state information indicating whether the specific operation may be capable of being performed from the control device and transmitting a response message including the state information to the control device in response to the request message.

The method may further include transmitting the request message to the plurality of devices. The first device may perform a role of transferring a message transmitted by the control device to the plurality of devices.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a schematic view illustrating an example of a wireless communication system using a Bluetooth low energy technology to which the present invention is applicable.

FIG. 2 is an internal block diagram of an example of devices to which the present invention is applicable.

FIG. 3 is a view illustrating an example of a Bluetooth low energy topology.

FIG. 4 is a view illustrating an example of a Bluetooth communication architecture to which the present invention is applicable.

FIG. 5 is a view illustrating an example of a structure of a generic attribute profile (GATT) of Bluetooth low energy.

FIG. 6 is a schematic diagram showing an example of a Bluetooth mesh network to which an embodiment of the present invention may be applied.

FIG. 7 is a flowchart illustrating an example of a method for joining, by a device, a Bluetooth mesh network to which an embodiment of the present invention may be applied.

FIG. 8 is a diagram showing an example of the transmission of mesh packet data in a mesh network to which an embodiment of the present invention may be applied.

FIG. 9 is a diagram illustrating the packet data types of a mesh network to which an embodiment of the present invention may be applied.

FIGS. 10 and 11 are diagrams for illustrating a problem occurring if a group device is controlled in an existing Bluetooth mesh network.

FIG. 12 is a diagram showing an example of a method for checking, by a control device, the state of a group device to which an embodiment of the present invention may be applied.

FIG. 13 is a diagram showing an example of a method for checking, by a control device, the state of a group device to which an embodiment of the present invention may be applied.

FIG. 14 is a diagram showing an example of a method for checking, by a control device, the state of a group device to which an embodiment of the present invention may be applied.

FIG. 15 is a diagram showing an example of a method for checking, by a control device, the state of a group device to which an embodiment of the present invention may be applied.

FIG. 16 is a diagram showing an example of a method for controlling, by a control device, a group device to which an embodiment of the present invention may be applied.

FIGS. 17 and 18 correspond to an embodiment to which the present invention may be applied and are diagrams illustrating a method for controlling, by a control device, a group device.

FIG. 19 is an embodiment to which the present invention may be applied and is a diagram illustrating a method for controlling, by a control device, a group device.

FIG. 20 is an embodiment to which the present invention may be applied and is a diagram illustrating a method for controlling, by a control device, a group device.

FIG. 21 is an embodiment to which the present invention may be applied and is a diagram showing a method for sending, by a control device, data to a group device.

FIG. 22 is an embodiment to which the present invention may be applied and is a flowchart illustrating a method for adaptively adjusting, by a control device, a repetition transmission number.

FIG. 23 is an embodiment to which the present invention may be applied and is a flowchart illustrating a method for receiving, by a group device, data from a control device.

FIG. 24 is an embodiment to which the present invention may be applied and is a diagram illustrating a method for controlling a group device using a control device.

FIG. 25 is an embodiment to which the present invention may be applied and is a flowchart for illustrating a method for controlling, by a control device, a device forming a group.

DETAILED DESCRIPTION OF THE EMBODIMENTS

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Also, a plurality of devices measuring exercising activities of human beings through a fitness equipment using a specific device have been presented, but a device transmitting measured exercising data through Bluetooth to show specific numerical values to users has not been introduced yet.

Thus, in order to solve the problems, the present disclosure proposes a method for measuring human's physical activity and transmitting and processing measured data through BLE to provide the same to a user.

FIG. 2 is an internal block diagram of an example of devices to which the present invention is applicable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate.

The user input interfaces 112 and 122 refer to modules providing a user input such as a screen button to the controllers to enable the user to control an operation of the devices.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIG. 4 is a view illustrating an example of a Bluetooth communication architecture to which the present invention is applicable.

Referring to FIG. 4, (a) of FIG. 4 illustrates an example of a protocol stack of a Bluetooth basic rate (BR/enhanced data rate (EDR) that supports GATT (Generic Attribute Profile), and (b) of FIG. 4 illustrates an example of a protocol stack of Bluetooth low energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

- The link manager layer 16 may perform ACL/SCO logical transport, logical link setup, and control
- Detach: The link manager layer 16 stops connection and informs a counterpart device about the reason for stopping connection.
- The link manager layer 16 performs power control and role switch.
- The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response in response to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a view illustrating an example of a structure of a generic attribute profile (GATT) of Bluetooth low energy.

Referring to FIG. 5, a structure for exchanging profile data of Bluetooth low energy may be looked through.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 based on a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute However, Bluetooth LE has variable link quality in terms of a wireless transmission characteristic and may have a shadow area exceeding a radio wave distance in terms of one-to-one connection characteristic. Accordingly, in order to solve such a problem, in Bluetooth, devices on which Bluetooth has been mounted may form a mesh network as a method for controlling devices through a multi-hop connection between the devices.

A mesh network is described below.

FIG. 6 is a schematic diagram showing an example of a Bluetooth mesh network to which an embodiment of the present invention may be applied.

As illustrated in FIG. 6, the mesh network refers to a network in which a plurality of devices is connected through Bluetooth in a mesh form and is capable of transmitting and receiving data.

The Bluetooth mesh network includes several relay nodes for relaying a message between a source device 200 that transmits data and a destination device 400 that receives data.

Alternatively, devices forming the Bluetooth mesh network may be divided into edge nodes 200 and 400 and relay nodes.

In the present invention, the name "node" refers to devices forming a mesh network, and a node and a device may be interchangeably used.

Each node includes a message cache for a recently received message. If a received message is already present in the message cache, the message is not relayed.

If a received message is not present in the message cache, however, the message is relayed and stored in the message cache.

In general, the edge node is supplied with power through a battery. The edge node may be in a sleep state at normal times and may wake up through an interaction or periodically.

The edge node may process a received message if the following condition is satisfied.

A message is not present in the message cache.
The message is authenticated by a known network key.
If the destination of the message is the unicast address of the edge node or a broadcast address or a group address is the address of the place to which the edge node belongs.

In general, the relay node is a device supplied with main power and always wakes up, and may send received data for other nodes.

The relay node may send a received message to another node if the following condition is satisfied.

The message is not present in the message cache.
The message is authenticated by a known network key.
When a field (e.g., a relay number value) indicating whether the message is to be relayed is a value that permits relay.
If a destination address is not a unicast address allocated to the relay node.

In a Bluetooth mesh network, a method for transmitting, by relay nodes, data may be divided into a flooding method and a routing method.

In the routing method, the source device 200 sends a message to a specific relay node. The specific relay node that has received the message sends the message based on information about another relay node or the destination device 400 to which the message is to be retransmitted.

The routing method uses a broadcasting channel or a point-to-point connection method for the reception and retransmission of a message.

Furthermore, in the routing method, a routing device that has received a message determines the best routing route(s) for sending the message to a middle device or a destination device, and determines that the message is to be transmitted through which route based on a determined routing table.

However, the routing method has disadvantages in that complexity is increased and a lot of memory is required as messages are increased because the messages have to be transmitted while maintaining routing tables. Furthermore, the routing method is less dynamic than the flooding method and it is more difficult to implement the routing method than the flooding method, but has an advantage of good scalability.

The flooding method refers to a method, wherein relay nodes that receive a message using a characteristic in which radio waves are spread into the air in all direction shoot the message into the air again.

That is, the flooding method refers to a method, wherein the source device 200 sends a message to relay nodes through broadcast channels and the relay nodes that have received the message send the message to the destination device 400 by sending the message to adjacent relay nodes.

In the flooding method, a broadcasting channel is used for the reception and retransmission of a message, and the transmission range of a message can be expanded.

A mesh network using the flooding method is a dynamic network. In a mesh network using the flooding method, a device may receive and transmit (or retransmit) a message as long as the density of the device is satisfied.

The flooding method has an advantage in that it can be easily implemented, but may have a scalability problem as a network expands because messages are transmitted without directivity.

That is, in a mesh network using the flooding method, when a device sends a message, a plurality of devices receives the message and sends the received message to a plurality of other devices.

Furthermore, in the flooding method, unlike in the routing method, a message can be easily transferred without a cost for constructing a routing table. However, the flooding method has a disadvantage in that network traffic is increased because all of relay device that have received a message retransmit the received message again.

In order to prevent such a problem, the number of devices forming a mesh network may be adjusted to 100 to 1000. An accurate number of devices may be determined by several factors.

For example, an accurate number of devices may be determined by a network capacity, a traffic load of data sources, latency of a network, and reliability requirements.

FIG. 7 is a flowchart illustrating an example of a method for joining, by a device, a Bluetooth mesh network to which an embodiment of the present invention may be applied.

A new device or a device that has not been provisioned has to experience a provisioning procedure in order to join a mesh network.

The provisioning procedure means a procedure for authenticating a device that has not been authenticated and providing basic information (e.g., a unicast address and various keys) for joining a mesh network.

That is, the provisioning procedure is a procedure in which a provisioner of a mesh network provides information necessary to join a mesh network.

A first device may obtain the address of a network, keys, a device identifier, and various types of information by which the first device operates as part of a mesh network through the provisioning procedure.

The provisioning procedure includes an invitation step, an exchanging public key step, an authentication step, and a distribution-of-provisioning data step.

The provisioning procedure may be performed through various types of bearers. For example, the provisioning procedure may be performed through an advertising-based bearer, a mesh provisioning service-based bearer or a mesh-based bearer.

The advertising-based bearer is an essentially established bearer. If an advertising-based bearer is not supported provisioning data cannot be transmitted through an advertising-based bearer, a provisioning service-based bearer or a mesh-based bearer may be used in a provisioning procedure.

The provisioning service-based bearer means a bearer for exchanging provisioning data through the GATT Protocol of an existing Bluetooth LE method. The mesh-based bearer refers to a bearer capable of exchanging provisioning data over a mesh network if a first device and a second device are not located in the distance where they can directly exchange data.

A procedure for establishing an advertising-based bearer is described later.

After a bearer is established between a first device and a second device, the first device may be provisioned through the following provisioning procedure.

Invitation Step

The invitation step starts when a second device scans a first device. The first device sends a beacon message to the second device (S701). The beacon message includes the UUID of the first device.

After scanning the first device through the beacon message, the second device sends an invite message to the first device (S702).

The invite message is a message that asks the first device whether it will perform a provisioning procedure or not. If the first device does not want to perform the provisioning procedure, it ignores the invite message.

If the first device wants to perform the provisioning procedure, that is, if the first device wants to join a mesh network, the first device sends a capability message to the second device as a response thereto (S703).

The capability message may include information about whether the first device supports the setting of a security algorithm, a public key, information indicating whether a value may be output to a user, and information indicating whether a value may be received from a user.

Exchanging Public Key Step

Thereafter, the second device sends a start message for starting provisioning to the first device (S704).

If a public key cannot be used using an out-of-band technology, the second device and the first device exchange public keys (S705, S706).

If a public key can be used through the out-of-band mechanism, however, the second device may send an ephemeral public key to the first device and may read a static public key from the first device using the out-of-band technology.

Thereafter, the second device authenticates the first device by performing an authentication procedure along with the first device (S707).

Distribution-of-Provisioning Data Step

If the first device is authenticated, the second device and the first device calculate and generate a session key.

Thereafter, the second device sends provisioning data to the first device (S708).

The provisioning data may include an application key, a device key, a network key, iVindex, and a unicast address.

The first device that has received the provisioning data sends a completion message as a response thereto, and thus the provisioning procedure is terminated (S709).

FIG. 8 is a diagram showing an example of the transmission of mesh packet data in a mesh network to which an embodiment of the present invention may be applied.

Referring to FIG. 8, a source device 200 (or a commander or a control device) configures a command required to be performed by a destination device 400 in a light profile level 801, that is, a profile layer (i.e., the highest layer of a protocol stack). The configured packet experiences a mesh-related layer to finally form mesh packet data 802.

Furthermore, the generated packet data 802 is transmitted to the destination device 400 through relay nodes.

FIG. 9 is a diagram illustrating the packet data types of a mesh network to which an embodiment of the present invention may be applied.

Referring to FIG. 9, the format of packets exchanged between devices in a Bluetooth mesh network may have three types.

FIG. 9(*a*) illustrates the first type of a mesh packet (mesh packet type #1), FIG. 9(*b*) illustrates the second type of a mesh packet (mesh packet type #2), and FIG. 9(*c*) illustrates the third type of a mesh packet (mesh packet type #3).

Referring to FIG. 9(*a*), the first type of a mesh packet is used to exchange information between devices which have not yet been registered with a mesh network, but want to be registered with the network. In the first type of a mesh packet, device information is transmitted using a device UUID field.

In this case, a parameter Device UUID indicates a device ID which is used in a mesh network instead of BD_ADDR chiefly used in Bluetooth.

Referring to FIG. 9(*b*), the second type of a mesh packet is used to exchange or update network-related information between devices that have been registered with a mesh network. In this case, information about the mesh network is exchanged using an NID (network ID) field.

In this case, a parameter CIVI indicates an IV index value which is now used in a mesh network.

Referring to FIG. 9(*c*), the third type of a mesh packet is used for the source device 200 to indicate a specific command for the destination device 400 using an Opcode (OP) field between devices that have been registered with a network.

In this case, a parameter IVI means an IV index, and is used to generate a nonce value for authenticating and encrypting a message.

Furthermore, a parameter NID means a network ID and is used as an ID to identify a network key.

A parameter SEQ indicates a value increasing whenever the source device 200 generates a new message and is used to check whether a message is redundant.

A parameter SRC indicates a 16-bit ID (node address) of a node that has first generated a mesh packet.

A parameter DST indicates a 16-bit ID (node address) of a node to which a mesh packet needs to be finally reached.

A parameter OP means Opcode and indicates an operation that needs to be performed by a node (i.e., a device) corresponding to the DST.

The second type of a mesh packet and the third type of a mesh packet (FIGS. 9(*b*) and 9(*c*)) are encrypted so that a packet can be transmitted and received between nodes only which have exchanged a network key and an application key by performing a provisioning procedure.

FIGS. 10 and 11 are diagrams for illustrating a problem occurring if a group device is controlled in an existing Bluetooth mesh network.

Referring to FIG. 10, it is assumed that a BLE mesh network includes a control device 200 and devices G1 to G7 forming a group A.

The control device 200 may instruct the group A (G1~G7) to perform a specific operation by sending a packet B to the group A.

In the existing BLE mesh network, there is no method for checking whether all of the devices forming the group A have successfully received the packet B transmitted by the control device 200.

Accordingly, for example, if the device G3, that is, one of the devices of the group A, has not received the packet B transmitted by the control device 200 for a reason, such as interference or a collision, the control device 200 or other devices of the group A is unaware that the device G3 has not received the packet B.

If the control device 200 instructs devices forming the group A to perform a specific operation through cooperation through the packet B, there may be a problem in the entire operation that needs to be performed by the group A due to the device G3, that is, a device that has not received the packet B from the control device 200.

Accordingly, an embodiment of the present invention proposes a method for checking, by the control device 200, the state of a group device so that all of devices forming a group receive a command from the control device 200 and perform a specific operation through cooperation.

When the cognitive ability of an average person is taken into consideration, if delay of 100 ms to 250 ms or more is generated, the human being can cognize the delay. Accordingly, the BLE mesh standard has regulated a requirement that the time taken for a packet transmitted by the source device 200 to reach the destination device 400 is within 200 ms.

Furthermore, the BLE mesh standard has regulated a requirement that the time taken for a relay node to receive a mesh packet and to send the received mesh packet to another node is within a maximum of 100 ms. That is, this means that the time taken for a relay node to receive a packet and to send the received packet to a next relay node may be within a maximum of 100 ms.

If a packet is transmitted from the source device 200 to the destination device 400 through three relay nodes, time of a maximum of 200 ms+100 ms*3=500 ms may be taken. That is, since the time may exceed a maximum of 250 ms, a user may cognize that the packet has been delayed. For this reason, user convenience may be deteriorated.

More specifically, a great problem may occur if devices forming a group perform a specific operation at specific time intervals between the devices.

Referring to FIG. 11, it is assumed that the control device 200 instructs a group A including group devices G1 to G5 to perform a specific operation (e.g., instructs the group A to perform the specific operation at specific time intervals between the group devices).

At points of time t1, t2, t3, t4, and t5, the control device 200 may instruct the group devices G1, G2, G3, G4, and G5 to perform the specific operation.

As described above, however, if delay is generated in a process of transmitting a message from the control device 200 to each of the group devices, the points of time are more delayed than a point of time tN intended by the control device 200, and thus the specific operations may be performed at points of time to which respective different delay times have been added.

If a command is not transmitted to each group device at a required point of time as described above, a user who wants the group devices to sequentially perform specific operations at specific time intervals may feel inconvenient.

In order to solve such a problem, an embodiment of the present invention proposes a method for controlling group devices so that they operate through cooperation.

The control device 200 (or commander) may check the state of each group device 500 before the control device 200 instructs the group devices 500 to perform a specific operation through cooperation. As described above, a process for checking the state of group devices forming a mesh network in order to check whether the group devices are in the state in which they can perform a cooperative work is called a cooperative work state check procedure.

Although the control device 200 instructs the group devices 500 to perform a specific operation (or scene), the group devices 500 may not be prepared to perform the specific operation. In such a case, the control device 200 may check whether the group devices 500 has been prepared to perform a command through a cooperative work state check procedure.

In other words, through the cooperative work state check procedure, the control device 200 may check whether the group devices have been prepared to perform the specific scene at a specific point of time.

If the control device 200 does not receive a response message for a state check message from a specific device through the cooperative work state check procedure or is aware that a specific device has not been prepared to perform the specific scene based on a parameter included in the response message (e.g., the parameter is indicating "Ready-False"), the control device 200 may not send a command.

The cooperative work state check for the group devices 500 by the control device 200 may be performed in various ways. Possible embodiments are described in detail as examples.

FIG. 12 is a diagram showing an example of a method for checking, by a control device, the state of a group device to which an embodiment of the present invention may be applied.

Referring to FIG. 12, it is assumed that the group device 500 includes group devices G1 500-1, G2 500-2, and G3 500-3.

The control device 200 may send a state check request message to each of the group devices belonging to the group in order to perform a cooperative work state check procedure.

If the number of devices forming a group is 3 as in the example of FIG. 12, the control device 200 may check the state of the group by sending three cooperative work check requests to the three devices, respectively.

The control device 200 sends a cooperative work check request message to the group device G1 500-1. In response thereto, the group device G1 500-1 sends a cooperative work check response message to the control device 200 (S1201).

In this case, the cooperative work check request message may include information about the address of the group device G1 500-1. The cooperative work check response message may include a parameter "Ready-True" or "Ready-False" indicating whether a command can be performed or not.

In this protocol, the control device 200 may check the state of the devices within the group by first sending a request and then receiving a response message. Alternatively, the control device 200 may check the state of the devices within the group without a separate request because the devices within the group periodically send response messages.

The control device 200 sends cooperative work check request messages to the group devices G2 and G3. In response thereto, the group devices G2 500-2 and G3 500-3 send cooperative work check response messages to the control device 200 (S1202, S1203).

In this case, steps S1201, S1202, and S1203 may be sequentially performed or performed at the same time.

If a cooperative work check response message is not received from the group devices G3 500-3, the control device 200 additionally sends a cooperative work check request message to the group devices G3 500-3 (S1204).

That is, if a response is not received from a device within the group, the control device 200 may check the state of all of the devices within the group by retransmitting a cooperative work check request.

By checking whether all of the devices within the group have been prepared to perform a command from the control device 200, the devices forming the group may successfully perform a specific operation through cooperation.

FIG. 13 is a diagram showing an example of a method for checking, by a control device, the state of a group device to which an embodiment of the present invention may be applied.

Referring to FIG. 13, it is assumed that the group device 500 includes group devices G1 500-1, G2 500-2, and G3 500-3.

The control device 200 sends a cooperative work check request message to each of the group devices G1 500-1, G2 500-2, and G3 500-3 (S1301).

That is, the control device 200 may send a state check request to all of devices belonging to a group in order to perform a cooperative work state check procedure.

In this case, the cooperative work state check request transmitted by the control device 200 may include group address information as a parameter.

If the number of devices forming a group is 3 as in the example of FIG. 13, the control device 200 may check the state of the group by sending a single cooperative work check request to the three devices.

The group device G2 500-2 that has received the cooperative work check request from the control device 200 sends a cooperative work check response to the control device 200 (S1302).

All of the group devices 500 that have received the cooperative work check request from the control device 200 may send respective cooperative work check responses to the control device 200 or some (e.g., the group device G2 500-2) of the group devices may representatively send a cooperative work check response to the control device 200.

The group devices G1 500-1 and G3 500-3 that have received the cooperative work check request from the control device 200 send cooperative work check responses to the control device 200 (S1303).

If the group device G2 500-2 has representatively sent a cooperative work check response to the control device 200, step S1303 may be omitted.

FIG. 14 is a diagram showing an example of a method for checking, by a control device, the state of a group device to which an embodiment of the present invention may be applied.

Referring to FIG. 14, the control device 200 sends a packet to group devices G1, G2, . . . , GN. In this case, the control device 200 may send the packet using a broadcast channel.

In a situation in which the control device 200 sends a cooperative work check request to group nodes including a plurality of nodes, all of the devices of the group nodes may not normally receive the request of the control device 200. The reason for this is that a collision is generated in the process of receiving, by the control device 200, packets from relay nodes.

Accordingly, in order for all of the devices of the group nodes to normally receive the packet from the control device 200, the control device 200 may repeatedly broadcast the same data.

The control device 200 may repeatedly send each packet four times. In this case, the packets transmitted according to a repetition number may be indicated by Tx0 to Tx3, and a transmission interval may be indicated by a sub-event.

By repeatedly sending the same packet, a probability that all of the devices belonging to the group may successfully receive the packet from the control device 200 can be increased.

In this case, the repetition number is only an example and may be implemented or set in various numbers.

Furthermore, if the control device 200 attempts to receive responses according to a request from the group devices, a collision may occur in the process of receiving packets transmitted by a plurality of nodes. In order to prevent data from being lost due to such a collision, the control device 200 may determine the section in which a response from each group node is received.

That is, after sending the packet, the control device 200 may divide a specific section into N intervals and allocate slots in which responses from the respective group devices 500 can be received to the N intervals.

By allocating the section of a slot for a response to each of the group devices 500, a phenomenon in which a collision is generated because a plurality of packets is received at the same time can be reduced.

As described above, a probability that delay may occur when a mesh packet is transmitted as the distance between the control device 200 and the destination device 400 is distant is increased. The reason for this is that if the distance between the control device 200 and the destination device 400 is distant, a probability that a packet will be transferred via a relay node between the control device 200 and the destination device is increased and thus processing time taken for a relay device to receive a mesh packet and to transfer the mesh packet again is added.

Accordingly, in order to solve such a problem, a user may use a method for selecting a representative device from among group devices, not allowing the control device 200 to directly communicate with the group devices, and allowing the control device 200 to communicate with a group leader, that is, a representative device. This is described below with reference to FIG. 15.

FIG. 15 is a diagram showing an example of a method for checking, by a control device, the state of a group device to which an embodiment of the present invention may be applied.

A control device 200 sends a cooperative work check request to a group leader device (hereinafter referred to as a "GL") 600 (S1501).

The cooperative work check request may include a group leader address (GL address) as a parameter.

In this case, a device having a hop distance of a 1-hop to 2-hop distance from group devices G1 500-1, G2 500-2, G3 500-3, and G4 500-4 may be selected as the GL 600 representative of a group.

The GL 600 that has received the cooperative work check request performs a cooperative work state check procedure along with the group devices (S1502).

The cooperative work state check procedure may be performed according to the same method as that described with reference to FIGS. 11 to 13.

After performing the cooperative work state check procedure, the GL 600 sends a cooperative work check response to the control device 200 (S1503).

That is, when receiving the cooperative work check request message from the control device 200, the GL 600 may check whether the group devices have been prepared to perform a cooperative work at specific time, and may send a message indicating a result of the check to the control device 200.

Step S1503 may be optionally performed and may be omitted according to circumstances.

By selecting a group leader device located at a 1-hop or 2-hop distance from among the group devices 500, a packet can be transmitted and received without the intervention of a relay node between the group devices 500 and the group leader device, and thus delay can be reduced.

That is, after receiving the cooperative work check request message from the control device 200, the group leader device checks whether the group devices 500 have been prepared to perform a group cooperative work, and sends the state message of the group devices.

A method for performing, by the control device 200, the cooperative work state check procedure of group devices has been described above. The aforementioned embodiments may be independently implemented or applied or the embodiments may be combined and implemented or applied. A method for performing, by group devices, a specific operation in response to a command from the control device 200 is described below.

The control device 200 may instruct devices that form a group to perform specific operations at specific time intervals. Such a procedure is called a cooperative work procedure.

The cooperative work procedure may be performed in various manners. Possible embodiments are described in detail below as examples.

First, a group device may send a cooperative work request message to each of group devices at a specific time interval. This is described below with reference to FIG. 16.

FIG. 16 is a diagram showing an example of a method for controlling, by a control device, a group device to which an embodiment of the present invention may be applied.

Referring to FIG. 16, it is assumed that a group device includes group devices G1 500-1, G2 500-2, G3 500-3, and G4 500-4 and the control device 200 instructs the group devices to perform specific operations at points of time t1, t2, t3, and t4, respectively.

The control device 200 sends a cooperative work request message to the group device G1 500-1, and the group device G1 500-1 sends a cooperative work response message to the control device 200 in response to the cooperative work request message (S1601).

That is, the control device 200 sends the cooperative work request message to the group device G1 500-1 at the point of time t1 at which an operation is required. In this case, the group device G1 500-1 that has received the cooperative work request message may send the cooperative work response message to the control device 200 in response to the cooperative work request message or such a process may be omitted.

The cooperative work request message may include the address of the group device G1 500-1 and cooperative work Opcode indicating the work to be instructed as parameters.

The control device 200 sends cooperative work request messages to the group devices G2 500-2, G3 500-3, and G4 500-4, and the group devices G2 500-2, G3 500-3, and G4 500-4 send cooperative work response messages to the control device 200 in response to the cooperative work request messages (S1602, S1603, S1604).

That is, the control device 200 sends the cooperative work request messages to the group devices G2 500-2, G3 500-3, and G4 500-4 at points of time at which operations are required. In this case, the group devices G2 500-2, G3 500-3, and G4 500-4 that have received the cooperative work request messages may send cooperative work response messages for the cooperative work request messages to the control device 200 or such a process may be omitted.

Each of the cooperative work request messages may include each of the addresses of the group devices G2 500-2, G3 500-3, and G4 500-4 and cooperative work Opcode indicating the work to be instructed as parameters.

Assuming that the group devices G1 500-1, G2 500-2, G3 500-3, and G4 500-4 are light devices, if a user wants an operation for sequentially turning on the light devices, a cooperative work procedure in the present embodiment may be performed.

As described above, the method for sending a command to each of devices belonging to a group may be implemented relatively easily. If the distance between the control device 200 and a group device is distant or interference is severe, however, delay may be generated and each group device may not operate at a required point of time.

For example, total time taken to perform a cooperative work may be represented as time from a point of time at which step S1601 is started to a point of time at which step S1604 is terminated. If time between steps is very short, a command may be transmitted to each group device at a point of time different from a point of time intended by a user due to delay, and thus a probability that a cooperative work may fail may be increased.

Furthermore, the control device 200 may send a cooperative work request message (or a control message) to the group devices using a group address. This is described below with reference to FIGS. 17 and 18.

FIGS. 17 and 18 correspond to an embodiment to which the present invention may be applied and are diagrams illustrating a method for controlling, by a control device, a group device.

Referring to FIG. 17, it is assumed that a group device includes group devices G1 500-1, G2 500-2, G3 500-3, and G4 500-4.

The group devices G1 500-1, G2 500-2, G3 500-3, and G4 500-4 adjust their initial wall clocks (S1701).

That is, the group devices G1 500-1, G2 500-2, G3 500-3, and G4 500-4 have their system times synchronized. In this case, for example, each group device may have the wall clock synchronized using a network time protocol (NTP).

A control device 200 sends a cooperative work request message to the group device (S1702).

In this case, the control device 200 may send the cooperative work request message to the group device through a broadcast channel.

The cooperative work request message may include a group address, that is, the address of the group device, cooperative work Opcode, time "t_basic", and time "t_start" as parameters. In this case, the time "t_basic" indicates a time unit in which an operation is performed between group devices. The time "t_start" indicates start time or reference time when an operation is performed.

More specifically, the time "t_start" may indicate time from time when the cooperative work request message is received to time when the execution of the work is started or may indicate reference time, that is, a reference for performing the work.

If the time "t_start" indicates time from time when the cooperative work request message is received to time when the execution of the work is started, each group device may perform the work based on the time. Furthermore, cooperative works may be sequentially performed by individually setting (or sending) the time "t_start" in (or to) each of the group devices.

Furthermore, if the time "t_start" indicates reference time, when the reference time is reached, the group device enters time counting mode. Furthermore, the group device may perform an operation after a lapse of specific time from the reference time. In this case, the specific time may be individually set in each group device and may be individually transmitted to each group device.

Hereinafter, a description of the present embodiment is based on the premise that the time "t_start" indicates reference time, for convenience of description.

In this case, as in the example of FIG. 18, in order to instruct a cooperative work, a "cooperative work" message may be used in an "Opcode" field.

The group devices that have received the cooperative work request message may send response messages for the cooperative work request message in order to indicate that the cooperative work request message has been successfully received or such a process may be omitted.

The group device G1 500-1 performs an operation requested by the control device 200 after a lapse of time t1 in time counting mode (S1703).

The group devices G2 500-2, G3 500-3, and G4 500-4 perform works requested by the control device 200 after a lapse of times t2, t3, and t4, respectively, in time counting mode (S1704, S1705, and S1706).

Each of the group devices G1 500-1, G2 500-2, G3 500-3, and G4 500-4 may check that the control device 200 wants to perform what operation using the cooperative work Opcode parameter of the cooperative work request message.

Furthermore, each group device may determine to perform an operation at what time unit based on the time "t_basic" or may determine to perform time counting from what point of time based on the time "t_start."

More specifically, each group device may have stored a specific parameter based on the sequence in which an operation is performed.

If the time "t_basic" is transmitted by the control device 200, each group device may perform an operation after a lapse of time obtained by multiplying the stored parameter by the time "t_basic."

For example, the group devices G1 500-1, G2 500-2, G3 500-3, and G4 500-4 have stored values N1, N2, N3, and N4 according to the sequence. In time counting mode, the group device G1 500-1 may perform an operation instructed by the control device 200 after a lapse of time obtained by multiplying the time "t_basic" by the value. Likewise, each of the group devices G2 500-2, G3 500-3, and G4 500-4 may perform an operation instructed by the control device 200 after a lapse of time obtained by multiplying the value "t_basic" by each of the values N2, N3, and N4 in time counting mode.

Furthermore, the specific parameter stored in each group device may indicate a specific time. That is, if the time "t_start" is transmitted by the control device 200, each group device may enter time counting mode at a specific point of time indicated by the time "t_start." Furthermore, the group devices may sequentially perform the operations after a lapse of specific times stored in the respective group devices or after a lapse of specific times received from the control device 200 in time counting mode.

In accordance with the method proposed by the present embodiment, a problem in that an operation is not performed at a specific point of time requested by a user due to delay occurring in a process of transferring a mesh packet from the control device 200 to each group device can be solved.

Furthermore, cooperative work request messages may be sequentially transmitted from the control device 200 to group devices according to the sequence in which operations are performed, and a specific operation requested by the control device 200 may be performed. This is described below with reference to FIG. 19.

FIG. 19 is an embodiment to which the present invention may be applied and is a diagram illustrating a method for controlling, by a control device, a group device.

A control device 200 sends a cooperative work request message to a group device G1 500-1 (S1901).

The cooperative work request messages may be sequentially transmitted to the respective group devices according to the sequence.

Accordingly, the control device 200 may send the cooperative work request message to the group device G1 500-1, that is, a device in which an operation is first performed. In this case, the cooperative work request message may include the address of the group device G1 500-1 and cooperative work Opcode as parameter.

In this case, the group device G1 500-1 may send a response message indicating whether the cooperative work request message has been received or not or such a process may be omitted.

Furthermore, the group device G1 500-1 may determine that it has to perform what operation by checking the cooperative work Opcode in the cooperative work request message received from the control device 200.

The group device G1 500-1 sends a cooperative work request message to the group device G2 500-2 (S1902).

In this case, the address of a device (i.e., the group device G2 500-2) executed in a next sequence may have been stored in the memory of the group device G1 500-1. Alternatively, operation sequence information for each group device may be included in a cooperative work request message transmitted by the control device 200, and the address of a device executed in a next sequence may be identified based on the sequence information.

That is, the group device G1 500-1 sends the cooperative work request message to a group device G2 500-2 executed in a next sequence. In this case, the cooperative work request message may include the address of the group device G2 500-2 and cooperative work Opcode as parameters.

The group device G2 500-2 sends a cooperative work request message to a group devices G3 500-3 (S1903).

In this case, the address of a device (i.e., the group device G3 500-3) executed in a next sequence may have been stored in the memory of the group device G2 500-2. Alternatively, operation sequence information for each group device may be included in a cooperative work request message transmitted by the control device 200, and the address of a device executed in a next sequence may be identified based on the sequence information.

The cooperative work request message may include the address of the group devices G3 500-3 and cooperative work Opcode as parameters.

The group device G3 500-3 sends a cooperative work request message to a group device G4 500-4 (S1904).

In this case, the address of a device (i.e., the group device G4 500-4) executed in a next sequence may have been stored in the memory of the group device G3 500-3. Alternatively, operation sequence information for each group device may be included in a cooperative work request message transmitted by the control device 200, and the address of a device executed in a next sequence may be identified based on the sequence information.

The cooperative work request message may include the address of the group device G4 500-4 and cooperative work Opcode.

If such a method is applied, after each group device performs an operation requested by the control device 200 or at the same time when group devices perform operations requested by the control device 200, a mesh packet is transferred to a group device of a next sequence. Accordingly, the control device 200 may control the group devices so that they perform the operations while maintaining a required sequence.

That is, in accordance with the present embodiment, a problem in that each group device does not operate at a point of time requested by a user due to delay occurring while a mesh packet is transferred from the control device 200 to the group device can be solved.

A probability that delay may occur when a mesh packet is transmitted as the distance between the control device 200 and a destination device increases is increased. The reason for this is that if the distance is distant, a probability that a packet will be transferred via a relay node is increased and thus processing time taken for a relay device to receive a mesh packet and to transfer the mesh packet again is added.

Accordingly, in order to solve such a problem, a user may use a method of selecting a representative device from among group devices, allowing the control device 200 and group devices to not directly communicate with each other, and allowing the control device 200 to send a command to only a group leader device, that is, the representative device. This is described below with reference to FIG. 20.

FIG. 20 is an embodiment to which the present invention may be applied and is a diagram illustrating a method for controlling, by a control device, a group device.

A control device 200 sends a cooperative work request message to a group leader device (hereinafter referred to as a "GL") 600 (S2001).

The cooperative work request message may include the address of the GL 600 as a parameter.

Furthermore, a device having a hop distance of a 1-hop to 2-hop distance from group devices G1 500-1, G2 500-2, G3 500-3, and G4 500-4 may be selected as the GL 600.

The GL 600 that has received the cooperative work request message performs a cooperative work procedure along with the group devices (S2002).

The cooperative work procedure may be performed according to the same method as that described with reference to FIGS. 15 to 18.

After performing the cooperative work procedure, the GL 600 may send a response message that notifies the control device 200 of a result or the termination of the cooperative work procedure to the control device 200 or such a process may be omitted.

By selecting the GL 600 located at the 1-hop or 2-hop distance from the group devices 500, a packet can be transmitted and received without the intervention of a relay node between the group devices 500 and the GL 600, and thus delay can be reduced.

FIG. 21 is an embodiment to which the present invention may be applied and is a diagram showing a method for sending, by a control device, data to a group device.

Referring to FIG. 21, the control device 200 sends a packet to group devices G1, G2, . . . , GN. In this case, the control device 200 may send the packet using a broadcast channel.

In a situation in which the control device 200 sends a cooperative work check request to group nodes including a plurality of nodes, all of the devices of the group nodes may not normally receive a request from the control device 200. The reason for this is that a collision is generated in a process of receiving packets from the control device 200 and the relay nodes.

Accordingly, in order for all of the devices of the group nodes to normally receive the packet transmitted by the control device 200, the control device 200 may repeatedly broadcast the same data.

The control device 200 may repeatedly send each packet four times. In this case, the packets transmitted according to a repetition number may be represented as TX0 to TX3, and a transmission interval may be represented as a sub-event.

By repeatedly sending the same packet, a probability that all of the devices belonging to a group will successfully receive the packet from the control device 200 can be increased.

In this case, the repetition number is only an example and may be implemented or set in various ways.

For example, it is assumed that group devices 500 include group devices G1 and G2 and the control device 200 has sent the same data four times.

The group devices in a scanning state receive packet data (TX packet) transmitted by the control device 200.

Each of the group devices 500 may ignore the remaining packets if any one of packets TX0~TX3 is received.

The group device G2 may not receive the packet TX0 because it performs another operation and may not normally receive the packet TX1 due to a collision attributable to interference between data although the group device G2 is in the scanning state. Furthermore, the group device G2 may successfully receive the packet TX2 and may ignore the packet TX3 because it has already received the packet TX2.

Furthermore, when the control device 200 tries to receive responses from the group devices in response to a request, a collision may be generated in the process of receiving packets transmitted by a plurality of nodes. In order to prevent data from being lost due to the collision, the control device 200 may determine the section in which a response is received from each group node.

That is, after sending a packet, the control device 200 may divide a specific section into N intervals and allocate a slot in which the response may be received from each group device 500 to each section.

By allocating the period of the slot for a response to each group device 500, a phenomenon in which a collision is generated because a plurality of packets is received at the same time can be reduced.

In FIG. 21, it is assumed that the number of times that the same packet data is transmitted is four. However, the number may be adaptively adjusted based on a cooperative work response.

For example, when the control device 200 normally receives a cooperative work response transmitted by each group device 500, the control device 200 does not need to redundantly send the same data several times.

Accordingly, in such a case, the number of times that the same packet data is broadcasted can be reduced. If the control device 200 does not normally receive a cooperative work response from the group device 500, the control device 200 may increase a redundant transmission number. Accordingly, a probability that all of the group devices 500 successfully receive packets transmitted by the control device 200 can be increased. This is described below with reference to FIGS. 22 and 23.

FIG. 22 is an embodiment to which the present invention may be applied and is a flowchart illustrating a method for adaptively adjusting, by a control device, a repetition transmission number.

A control device 200 waits for a user's input for controlling group devices and sets a "count" value to 0 (S2201).

The control device 200 sends data for controlling the group devices in response to the user's input and increases the "count" value by 1 (S2202).

The control device 200 scans response message transmitted by respective group devices in order to check whether packet data transmitted by all of the devices has been successfully received (S2203).

The control device 200 determines whether all of the group devices have successfully received the data (S2204).

If, as a result of the determination at step S2204, it is determined all of the group devices have successfully received the data, the control device 200 decreases an adaptation repetition number (S2205).

In this case, the control device 200 may decrease the adaptation repetition number by 1 whenever the data is successfully received or may decrease the adaptation repetition number by accumulating the number of times that the data is successfully received.

If, as a result of the determination at step S2204, it is found that all of the group devices have not successfully received the data, the control device 200 increases the adaptation repetition number (S2206).

In this case, the control device 200 may increase the adaptation repetition number by 1 whenever the data is successfully received or may increase the adaptation repetition number by accumulating the number of times that the data is successfully received.

The control device 200 determines whether a "count" value is identical with a "repetition number" value (S2207).

If, as a result of the determination at step S2207, it is determined that the "count" value is not identical with the "repetition number" value, the control device 200 waits for a next sub-event (S2108).

When a point of time of a next sub-event is reached, the control device 200 sends the same data at step S2202 and increases the "count" value by 1.

If, as a result of the determination at step S2207, it is determined that the "count" value is identical with the "repetition number" value, the control device 200 increases the sequence of the data by 1 and sets the "repetition number" value to an "adaptation repetition number" (S2209).

That is, although a repetition number value has been initially set, the repetition number value may be adaptively adjusted by taking into consideration an environment in which data is transmitted.

A method for adaptively adjusting a repetition number value may be optionally selected. If the repetition number value is not adaptively adjusted, but an initially set value is maintained, steps S2203 to S2206 may be omitted.

FIG. 23 is an embodiment to which the present invention may be applied and is a flowchart illustrating a method for receiving, by a group device, data from a control device.

A group device waits for a command from the control device 200 in a scanning state (S2301).

The group device receives data having a specific "SEQ" value (S2302).

The group device determines whether the "SEQ" value of the received data is identical with a sequence "mSEQ" value to be received (S2303).

If, as a result of the determination at step S2303, it is determined that the "SEQ" value of the received data is not identical with the "mSEQ" value, the group device maintains the scanning state (S2304).

If, as a result of the determination at step S2303, it is determined that the "SEQ" value of the received data is identical with the "mSEQ" value, the group device determines that the data has been successfully received (S2305).

If, as a result of the determination at step S2305, it is determined that the data has not been successfully received, the group device maintains the scanning state.

If, as a result of the determination at step S2305, it is determined that the data has been successfully received, the group device increases the "mSEQ" value by 1 (S2306).

That is, after successfully receiving the data, the group device receives data having a next sequence value.

Detailed user cases of embodiments proposed by the present invention are described as examples.

The method proposed by the present invention may be used to guide the location of a specific store, the location of a specific event hall, and the location of a seat within a movie theater in a department store, a shopping mall, and a movie theater, for example, to a user.

That is, a user wants to find out a specific location in a building, such as a department store, a shopping mall or a movie theater. In this case, the phone of the user may play the role of the control device 200. Furthermore, devices such as lights disposed within a building, such as a department store, a shopping mall or a movie theater, may be group devices.

When the user enters the building, such as a department store, a shopping mall or a movie theater, the control device 200 performs a cooperative work procedure. For example, lights in a path from the entrance of a movie theater to the seat of the user may be sequentially turned on and the brightness of the lights may be controlled to guide the location of a seat to the user. This is described below with reference to FIG. 24.

FIG. 24 is an embodiment to which the present invention may be applied and is a diagram illustrating a method for controlling a group device using a control device.

Referring to FIG. 24, it is assumed that a user is provided with guidance of a C column No. 6 seat within a movie theater through group devices.

The user presses a button for being provided with guidance of the C column No. 6 seat in the control device 200 (e.g., a smart phone).

At this time, the control device 200 sends a cooperative work request message, including a group address (e.g., 0x11001100) and a "Guide to C6" command (or Opcode), to group devices G1 to G11 that guide the C column No. 6 seat.

In this case, the group devices G1 to G11 may have their wall clocks (or system time) synchronized according to the method described with reference to FIG. 17.

The group devices G1 to G11 are sequentially turned on from the group device G1 in response to the cooperative work request message.

Furthermore, if the cooperative work request message including the time "t_basic" of 500 ms is transmitted, the group device G1 that has received the cooperative work request message starts time counting and then starts to turn on after 500 ms. Furthermore, the group devices G2 to G11 are sequentially turned on at intervals of 500 ms. Thereafter, after the group devices G1 to G11 are turned on for a predetermined time, the group device G1 is turned off or turned on again so that the user may recognize his or her user.

The aforementioned embodiments may be independently applied or a plurality of the embodiments may be applied in combination.

FIG. 25 is an embodiment to which the present invention may be applied and is a flowchart for illustrating a method for controlling, by a control device, a device forming a group.

A first device joins a Bluetooth mesh network (S2501).

In this case, the first device may join the Bluetooth mesh network according to the method for joining a mesh network, which has been described with reference to FIG. 7.

The first device receives a control message for instructing the execution of a specific operation from a control device (S2502).

As described above, the control device may instruct group devices to perform a specific operation through cooperation. Furthermore, the specific operation performed by the group devices through cooperation may also be called a specific scene.

Furthermore, as described with reference to FIGS. 12 to 15, the control device may check whether the specific operation may be performed before it instructs the execution of the specific operation.

More specifically, the control device may send a request message that requests state information, indicating whether the specific operation may be performed, to the group device and may send a response message, including the state information, to the control device in response to the request message.

Furthermore, if the first device is a group leader device functioning to transfer a message transmitted by the control device to a plurality of devices within a group other than the first device, the first device may send the request message to the plurality of devices.

The first device performs a specific operation based on a control message (S2503).

In this case, the specific operation may be sequentially performed by the first device and the plurality of devices which form the group.

As described with reference to FIG. 17, the devices forming the group may have their time synchronized for an operation between the group devices.

In this case, the control message transmitted by the control device may include a time interval field indicating a time interval in which the specific operation is performed between the first device and the plurality of devices forming the group, a delay time field indicating delay time from time when the control message was received to time when the specific operation is performed or a reference time field indicating reference time, that is, a reference for performing the specific operation.

If the control message includes the time interval field, the specific operation may be sequentially performed by the first device and the plurality of devices based on the time interval.

Furthermore, if the control message includes the delay time field, the specific operation may be performed by the first device and the plurality of devices based on the delay time. In this case, the delay time may be individually set in each of the first device and the plurality of devices.

Furthermore, if the control message includes the reference time field, the specific operation may be performed by the first device and the plurality of devices after a lapse of a specific time from the reference time. In this case, the specific time may be individually set in each of the first device and the plurality of devices so that the specific operation is sequentially performed according to a operation sequence.

Furthermore, as described with reference to FIG. 19, the control message may be sequentially transmitted from the first device to the plurality of devices within the group in a relay manner according to the sequence in which the specific operation is performed.

Furthermore, as described with reference to FIG. 20, if the first device is a group leader device that plays the role of transferring the message from the control device to the plurality of devices within the group other than the first device, the first device may send the control message to the plurality of devices.

Furthermore, as described with reference to FIG. 21, the control message may be repeatedly transmitted by a specific number so that the group devices can successfully receive the control message.

Furthermore, as described with reference to FIGS. 22 and 23, the specific number may be adaptively adjusted depending on whether all of the group devices successfully receive the control message.

The present invention is not limited and applied to the configurations and methods of the aforementioned embodiments, but some or all of the embodiments may be selectively combined and configured so that the embodiments are modified in various ways.

Furthermore, the present invention described above may be substituted, modified or changed by a person having ordinary skill in the art to which the present invention pertains without departing from the technological spirit of the present invention, and thus is not restricted by the aforementioned embodiments and the accompanying drawings.

The present invention may have, but not limited to, the following effects:

In accordance with an embodiment of the present invention, all of group devices belonging to a group can operate to successfully perform a specific operation because whether all of the devices have been prepared to perform a command from a control device is checked.

Furthermore, in accordance with an embodiment of the present invention, a probability that all of devices belonging to a group can successfully receive a packet from a control device can be increased because the same packet is repeatedly transmitted, and a collision occurring between data because the data is received at the same time can be reduced because a section for a response is allocated to each group device.

Furthermore, in accordance with an embodiment of the present invention, data can be transmitted and received without the intervention of a relay node between a group device and a group leader device because the group leader device is selected and data is transmitted and received between the group leader device and the group device, and thus delay can be reduced.

Furthermore, in accordance with an embodiment of the present invention, group devices can sequentially perform a cooperative work as intended by a user because system times are synchronized between the group devices and information related to an operating time is received from a control device.

Advantages which may be obtained by the present invention are not limited to the aforementioned advantages, and various other advantages may be evidently understood by those skilled in the art to which the present invention pertains from the following description.

What is claimed is:

1. A method of a first device being controlled by a control device in a group comprising the first device and a plurality of devices in a Bluetooth mesh network, the method comprising:
  joining the Bluetooth mesh network;
  synchronizing a time with the plurality of devices for operations of the first device and the plurality of devices:
  receiving a control message instructing an execution of a specific operation from the control device; and
  performing, the specific operation based on control message,
  wherein the specific operation is sequentially performed by the first device and the plurality of devices, and
  wherein the control message includes a time interval field indicating a time internal in which the specific operation is performed between the first device and plurality of devices, a delay time field indicating a delay time from a time when the control message is received to a time when the specific operation is performed, or reference time field indicating a reference time which is a reference for performing the specific operation.

2. The method of claim 1, wherein if the control message includes the time interval field, the specific operation is sequentially performed by the first device and the plurality of devices based on the time interval.

3. The method of claim 1, wherein if the control message includes the delay time field, the specific operation is performed by the first device and the plurality of devices based on the delay time, and
  the delay time is individually set in each of the first device and the plurality of devices.

4. The method of claim 1, wherein if the control message comprises the reference time field, the specific operation is performed by the first device and the plurality of devices after a lapse of a specific time from the reference time, and
  the specific time is individually set in each of the first device and the plurality of devices.

5. The method of claim 1, wherein the control message is sequentially transmitted between the first device and the plurality of devices according to an operation sequence of the specific operation.

6. The method of claim 1, further comprising:
  transmitting the control message to the plurality of devices,
  wherein the first device performs a role of transferring the message transmitted by the control device to the plurality devices.

7. The method of claim 1, wherein the control message is repeatedly transmitted to the first device and the plurality of devices by a specific number of times.

8. The method of claim 7, wherein the specific number is decreased if the first device and the plurality of devices successfully receive the control message and is increased if at least one of the first device and the plurality of devices does not receive the control message.

9. The method of claim 1, further comprising
  receiving a request message to request state information indicating whether the specific operation is capable of being performed from the control device; and
  transmitting a response message comprising the state information to the control device in response to the request message.

10. The method of claim 9, further comprising:
  transmitting the request message to the plurality of devices, wherein the first device performs a role of transferring a message transmitted by the control device to the plurality of devices.

11. A first device controlled by a control device in a group comprising the first device and a plurality of devices in a Bluetooth mesh network, the first device comprising,
- a communication unit configured to perform communication with an outside in a wired or wireless manner; and
- a processor functionally connected to the communication unit, wherein the processor is configured to:
  - join the Bluetooth mesh network,
  - synchronize a time with the plurality of devices for operations of the first device and the plurality of devices,
  - control the communication unit to receive a control message instructing an execution of a specific operation from the control device, and
  - perform the specific operation based on the control message,
- wherein the specific operation is sequentially performed by the first device and the plurality of devices, and
- wherein the control message includes a time interval field indicating a time interval in which the specific operation is performed between the first device and plurality of devices, a delay time field indicating a delay time from a time when the control message is received to a time when the specific operation is performed, or a reference time field indicating a reference time which is a reference for performing the specific operation.

* * * * *